(12) United States Patent
Noe et al.

(10) Patent No.: US 6,678,430 B1
(45) Date of Patent: Jan. 13, 2004

(54) METHOD FOR DC DRIFT-FREE POLARIZATION TRANSFORMATION AND DC DRIFT-FREE POLARIZATION TRANSFORMER

(75) Inventors: Reinhold Noe, Paderborn (DE); David Sandel, Paderborn (DE)

(73) Assignee: Siemens Aktiegesellschaft, Munich (DE)

( * ) Notice: Subject to any disclaimer, the term of this patent is extended or adjusted under 35 U.S.C. 154(b) by 0 days.

(21) Appl. No.: 09/465,285

(22) Filed: Dec. 16, 1999

(30) Foreign Application Priority Data

| Dec. 16, 1998 | (DE) | ......... 198 58 148 |
| Apr. 16, 1999 | (DE) | ......... 198 17 381 |
| Apr. 29, 1999 | (DE) | ......... 199 19 576 |

(51) Int. Cl.$^7$ .............................. G02B 6/00
(52) U.S. Cl. .................. 385/11; 385/2; 385/3; 385/8; 385/14; 385/40; 359/484; 359/184
(58) Field of Search .................. 385/11, 14, 31, 385/2, 3, 28, 40, 130, 8–9; 359/494, 484; 398/183, 184, 187, 188

(56) References Cited

U.S. PATENT DOCUMENTS

| 5,361,270 A | * 11/1994 | Heismann ............... 372/27 |
| 5,739,943 A | 4/1998 | Ohshima et al. |
| 5,757,984 A | 5/1998 | Hatori |

FOREIGN PATENT DOCUMENTS

| DE | 198 30 990 A1 | 1/2000 |
| JP | 6-308438 | 11/1994 |

OTHER PUBLICATIONS

Fred Heismann et al.: "Integrated–Optical Single–Sideband Modulator and Phase Shifter", IEEE Journal of Quantum Electronics, vol. QE–18, No. 4, Apr. 1982, pp. 767–771.

R.C. Alferness et al.: "Low loss, wavelength tunable, waveguide electro–optic polarization controller for $\lambda$ = 1.32 $\mu$m", Appl. Phys. Lett. vol. 47, No. 11, Dec. 1, 1985, pp. 1137–1139.

Fred Heismann: "Integrated–Optic Polarization Transformer for Reset–Free Endless Polarization Control", IEEE Journal of Quantum Electronics, vol. 25, No. 8, Aug. 1989, pp. 1898–1906.

H. Herrmann et al.: "Integrated optical, acoustically tunable wavelength filters and switches and their network applications", ECIO'93, University Paderborn, Germany.

R. Noe et al.: "Fiber–Based Distributed PMD Compensation at 20 GB/S",ECOC'98, Sep. 20–24, 1998, Madrid, Spain.

F. Heismann et al.: "Electro–Optically Tunable, Narrowband Ti:LiNbO$_3$ Wavelength Filter", Electronics letters, May 7, 1987, vol. 23, No. 11, pp. 572–574.

* cited by examiner

*Primary Examiner*—Drew A. Dunn
*Assistant Examiner*—Fayez Assaf
(74) *Attorney, Agent, or Firm*—Laurence A. Greenberg; Werner H. Stemer; Ralph E. Locher

(57) ABSTRACT

A polarization transformer/PMD compensator chip contains a differential TE-TM phase modulator at its input. The modulator generates a TE-TM phase modulation. The mode converter voltages are driven with driving signals that are free of DC components. DC drift is thereby safely avoided.

35 Claims, 19 Drawing Sheets

METHOD FOR DC DRIFT-FREE POLARIZATION TRANSFORMATION AND DC DRIFT-FREE POLARIZATION TRANSFORMER

BACKGROUND OF THE INVENTION

Field of the Invention

The invention relates to a method for DC drift-free polarization transformation and DC drift-free polarization transformers.

German patent application DE 19 830 990.2 describes a polarization transformer/compensator which is implemented on a birefringent substrate material. This is a development from a polarization transformer which has been described in IEEE Journal of Quantum Electronics, Vol. QE-18, No. 4, April 1982, pages 767–71.

That configuration consists of a lithium niobate chip, which carries electrodes at its surface. An isolating buffer layer is usually applied between the substrate and the electrodes which prevents the attenuation of the optical signal if metal electrodes are used. That configuration is subject to the so-called DC drift problem which is caused by signals of constant polarity. The DC drift problem is caused by the fact that buffer layers and electrodes exhibit different ratios of dielectricity constant to conductivity. Due to the dielectric properties of substrate and buffer layer the initial potential distribution is initially given by the electrostatic field. As time goes by it will be modified and will converge into a potential distribution given by conductivities of substrate and buffer layer. Although the voltage applied to the electrodes stays constant the field inside the lithium niobate chip changes due to the new potential distribution, in particular also inside the optical waveguide which means not the desired but another electro optic effect will result.

Another, very pernicious reason for DC drift is believed to be due to the fact that high incident optical power, but also usual power applied over longer time periods, can produce charge carrier pairs due to absorption. If a DC voltage and hence an electrical field is present between the electrodes these charge carrier pairs will be separated by the electrical field. This results in a weakened electrical field. Therefore higher and higher voltages are needed in time to achieve the desired polarization transformations. This either exceeds the capabilities of the chosen voltage sources or will result in discharges between the electrodes. It has to be considered that a high-performance polarization transformer of the mentioned kind may require fairly high voltages of up to about 100V. DC drift can therefore restrict or even prevent the due function of a compensator. DC drift occurs also in almost all other lithium niobate components (polarization transformers) designed for polarization transformation and PMD compensation, for which a solution of the drift problem is also sought therefore.

Up to now it has been attempted to solve the problem by improved technology with improved balance of dielectricity constant and conductivity of the buffer layer, by a crystal with lower loss, and by other means. Even for lithium niobate intensity modulators which are operated only with small voltages this seems to have been managed only partly.

SUMMARY OF THE INVENTION

It is accordingly an object of the invention to provide a method for DC drift-free polarization transformation and DC drift-free polarization transformers, which overcomes the above-mentioned disadvantages of the heretofore-known devices and methods of this general type and which offers a relatively simple method for avoiding DC drift in polarization transformers and PMD compensators.

With the foregoing and other objects in view there is provided, in accordance with the invention, a method for DC drift-free polarization transformation or polarization mode dispersion compensation by a polarization transformer having a waveguide and control electrodes, which comprises:
  feeding control voltages to the control electrodes for changing a state-of-polarization or a polarization mode dispersion of an optical signal; and
  adjusting the control voltages to have substantially vanishing DC components.

In accordance with an added feature of the invention, the method further comprises applying a differential phase modulation of two orthogonal principal states-of-polarization of the optical signal which are identical to the principal states-of-polarization of a polarization transformer at a signal input with a continuous differential phase shift chosen such that a temporal average of a cosine function thereof and a temporal average of sine function thereof vanish at least approximately.

The solution of the problem lies in the use of DC component-free driving voltages. The architecture of the polarization transformer and the driving voltages are chosen such that the function of the polarization transformer is not compromised. A large number of embodiments exist, all of which are based on the same principle.

In an embodiment of the invention it is particularly advantageous to apply a differential phase modulation between the two orthogonally polarized principal states-of-polarization (PSP) of the polarization transformer. If the principal states-of-polarization are TE- and TM waves (TE—transverse electric; TM—transverse magnetic), a differential TE-TM phase modulator at the input of a compensator can be provided.

This has the advantage that a differential TE-TM phase modulation of the incident lightwave is generated. For a suitably chosen phase modulation the following TE-TM mode converter cells can be driven by DC voltage-free signals.

It is particularly advantageous to drive the TE-TM phase modulator by a triangular voltage of low frequency.

This allows the TE-TM converter electrodes to be driven by DC component-free cosine or sine voltages (to be more precise: usually by subsequent parts of sine voltages applied in alternately forward and backward direction of the angle argument). These converter voltages are impressed as cosine or sine functions while the actual task of PMD compensation results only from changes of amplitude and phase. Since the triangular voltage can also be chosen free of DC component there is no DC drift in the differential TE-TM phase modulator either in this case; however, it would not be detrimental there anyway.

At least a part of the converter driving voltages, just like the driving voltage of the phase modulators or mode converters, can be generated by a control unit.

Alternatively to the use of a TE-TM phase modulator a corresponding differential TE-TM phase modulation can also be generated by one or a few TE-TM converters which are preferably situated in the input section of the chip. For this purpose those converter cells which are not situated in the input section of the chip receive DC voltage-free driving voltages while the driving voltages of the first converter cells are generated by the compensatory control system.

Another possibility to generate a differential TE-TM phase modulation consists in adding at least one converter cell which just like the first converter cell used for PMD compensation is operated with special DC component-free driving voltages.

The use of a second TE-TM phase modulator can be advantageous in order to achieve an output state-of-polarization that is independent of time-dependent changes of the driving voltage. The same is valid for the other described ways for realization or substitution of a TE-TM phase modulator.

The methods described for TE and TM waves as principal states-of-polarization can also be used for other, e.g., circular principal states-of-polarization.

However, as an architecture of a polarization transformer which allows for a DC component-free choice of driving voltages without compromising the function of the polarization transformer, the enhancement of polarization transformers by additional control elements such as differential phase modulators, mode converters or additional converter cells is likewise possible.

With the above and other objects in view there is provided, in accordance with the invention, a polarization transformer for DC drift-free polarization transformation or polarization mode dispersion compensation, comprising:

a chip having a waveguide with an input;

a plurality of comb-shaped mode converter electrodes disposed perpendicularly to the waveguide, the mode converter electrodes receiving control voltages for changing a state-of-polarization or a PMD of an optical signal;

a comb-shaped ground electrode disposed in vicinity of the mode converter electrodes; and a device selected from the group consisting of a differential phase modulator and a mode converter at the input.

In accordance with an added feature of the invention, another phase modulator or mode converter is disposed at the output.

In accordance with an additional feature of the invention, at least one converter cell is defined on the chip, the converter cell comprising several comb-shaped converter electrodes running perpendicular to the waveguide, and a comb-shaped ground electrode.

In accordance with another feature of the invention, the converter cells include TE-TM converter cells having two mode converter electrodes with varying spaces between mutually adjacent mode converter electrodes.

In accordance with a preferred embodiment of the invention, the polarization transformer is implemented on a lithium niobate chip with at least approximate Y propagation. Preferably, the chip has an at least approximate X cut or Z cut.

In accordance with a further feature of the invention, a differential phase shifter comprises two electrodes running on either side of the waveguide.

With the above and other objects in view there is also provided, in accordance with the invention, a polarization transformer for DC drift-free polarization transformation or polarization mode dispersion compensation, comprising:

a chip having a chip surface, a waveguide with an input, and a plurality of comb-shaped mode converter electrodes receiving control voltages for changing a state-of-polarization or a PMD of an optical signal;

a device selected from the group consisting of a differential phase modulator and a mode converter at the input; and electrodes on two sides of the waveguide for generating electrical fields along the chip surface running perpendicular to the waveguide.

There is also provided, in accordance with the invention, a polarization transformer for DC drift-free polarization transformation or polarization mode dispersion compensation, comprising:

a chip having a waveguide with an input;

a plurality of mode converter electrodes receiving driving voltages for changing the state-of-polarization or the PMD of an optical signal; and a device selected from the group consisting of a differential phase modulator and a mode converter at the input.

In accordance with again an added feature of the invention, a further polarization control element operates substantially as a quarterwave plate and has eigenmodes allowing for a transformation of a circular state-of-polarization into a principal state-of-polarization of a polarization-maintaining optical fiber connected to the polarization transformer.

In accordance with again an additional feature of the invention, at least one polarization-maintaining optical fiber is connected to the chip at a defined connection point and having principal states-of-polarization enclosing angles of ±45° with respect to a chip surface of the chip, and a polarization control element disposed at the connection point and having substantially horizontal and vertical eigenmodes.

In accordance with again a concomitant feature of the invention, the differential phase modulator is a circular retarder.

With the above objects in view there is further provided, in accordance with the invention, a polarization transformer for DC drift-free polarization transformation or polarization mode dispersion compensation, comprising:

a chip having a waveguide conducting an optical signal;

at least one first polarization transformer for changing a state-of-polarization or a PMD of the optical signal;

at least one second polarization transformer adapted to alternately and at least partly take over a function of the at least one first polarization transformer and to be driven by driving signals opposed to taking over the function.

Other features which are considered as characteristic for the invention are set forth in the appended claims.

Although the invention is illustrated and described herein as embodied in method for DC drift-free polarization transformation and DC drift-free polarization transformer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following

DESCRIPTION OF THE PREFERRED EMBODIMENTS

Figure 1:
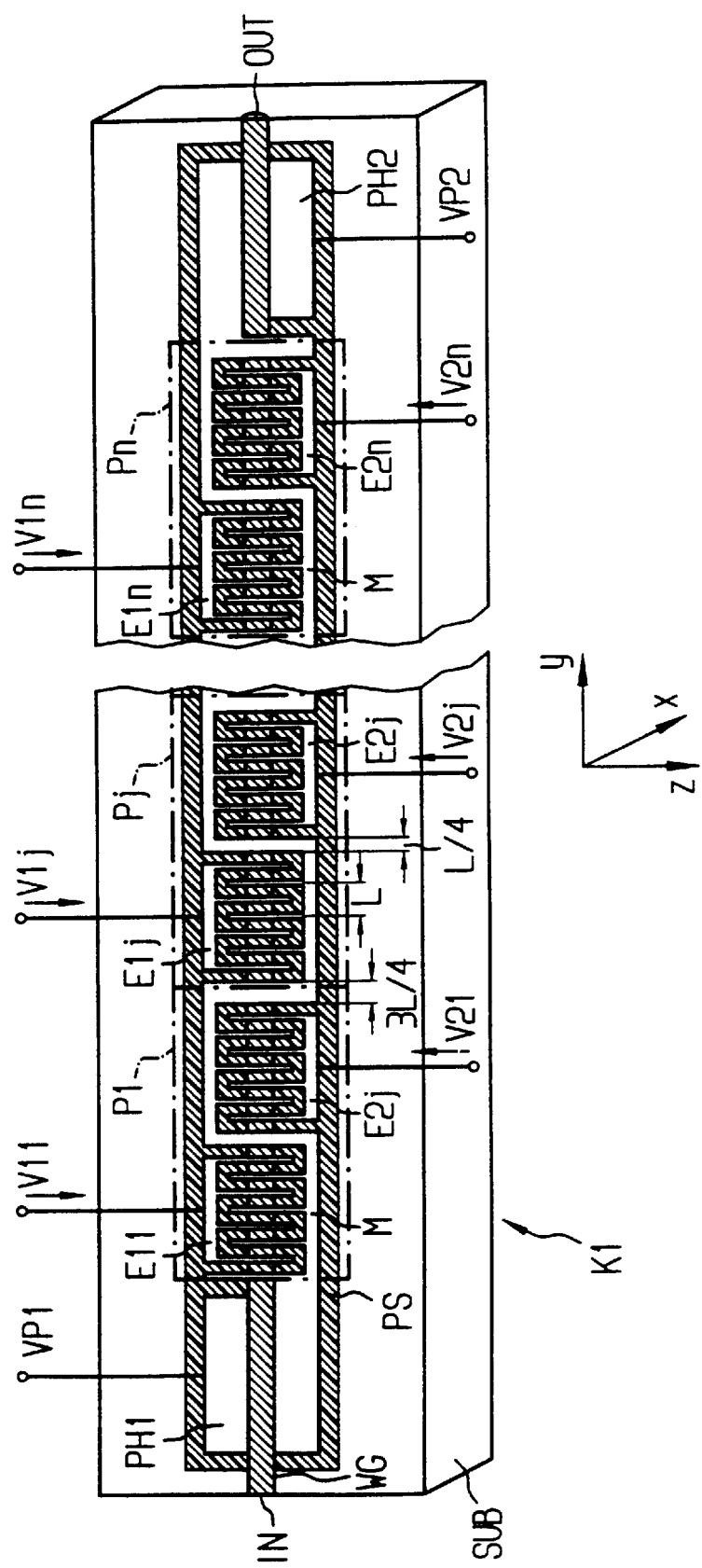
FIG. 1 is a diagrammatic perspective view of the architecture principle of a compensator embodying the principles of the invention.

Referring now to the figures of the drawing in detail and first, particularly, to FIG. 1 thereof, there is seen an embodiment of a polarization transformer/PMD compensator K1 embodying the principles of the invention. The device is realized as a chip by a lithium niobate substrate SUB. Other usable materials are lithium tantalate or similar highly birefringent materials. The crystallographic axes Y and Z lie in the drawing plane, the crystallographic axis X penetrates the drawing plane (X cut). Other embodiments are likewise possible.

A waveguide WG is disposed at the chip surface by titanium indiffusion along the crystallographic Y axis (Y propagation). The waveguide WG exhibits monomode behavior which means TE and TM waves can propagate, with a refractive index difference of about 0.07. At the chip surface there is initially applied a buffer layer PS made of silicon dioxide or another isolator which is not displayed at the location of the waveguide (if, however, the electrodes are optically transparent, e.g., are made of indium tin oxide the buffer layer may not be needed).

Electrically conducting interdigital electrodes E1J, E2j are deposited onto the buffer layer in the form of a comb. The teeth (fingers) of the comb-shape are oriented perpendicular with respect to the waveguide. An electrode M with teeth equally oriented perpendicular with respect to the waveguide runs in a meandering pattern over the whole chip and may be connected to ground (ground electrode). Embodiments in which all comb electrode connections are situated at one side of the waveguide while all ground electrode combs are connected at the other side of the waveguide are likewise possible. The other comb-shaped mode converter electrodes E1J, E2j (j=1, 2, ..., n)—also called mode converters—are electrically isolated with respect to each other. The driving voltages Vij at the electrodes can be chosen individually or in groups individually. Every pair of two electrodes E1J and E2j, which may also be connected to further electrodes in distances equal to an integer multiple of the beat length, is called a TE-TM converter cell Pj.

The modes which are converted are at the same time the principal states-of-polarization of adjacent waveguide sections, hence TE and TM waves in this embodiment.

A voltage at an electrode generated an electrical field in the waveguide WG which as a function of propagation coordinate Y is spatially periodic in crystal cut direction X and opposed hereto. The spatial periodicity of the electrostatic field causes phase matching between TE and TM wave which means mode conversion contributions of subsequent electrode fingers add.

The optical wave or optical signal OS passes the chip from input IN to output OUT.

A beat length is that length for which retarders/compensators with TE and TM waves as eigenmodes exhibit just a phase delay of 360° between these eigenmodes. For an optical wavelength of 1550 nm (nanometers) this beat length corresponds in lithium niobate to about 21 $\mu$m (micrometers).

The period length of the electrode teeth, i.e. the distance L, is approximately equal to the beat length. The width of the teeth and the electrode gaps are therefore preferably chosen roughly equal to L/4 each. This results in a uniform structure in which teeth widths and gaps are equal.

In order to be able to perform TE-TM mode conversion with variable phase additional spaces of alternately L/4 and 3L/4 are provided behind the periodic teeth of an electrode. This results in additional phase delays between TE and TM waves of 90° and 270°, respectively. The latter undoes the former so that TE-TM conversion occurs with different phase angles an different states-of-polarization can be adjusted. The ground electrode M at these spaces has a total width of about L/2 and L, respectively.

A TE-TM converter which at the same time can produce an arbitrary phase delay $\phi$ (t) between TE and TM waves, is in general made up of several or even many such periodical structures. An example for this is found in F. Heismann, R. Ulrich, "Integrated-optical single-sideband modulator and phase shifter", IEEE J. Quantum Electronics 18(1982)4, pp. 767–771.

However, a TE-TM converter can also be composed of a truly limited, fairly small number of elementary comb electrode pairs. This is found in the German patent application P 198 39 308.3 filed on Aug. 28, 1998: "Polarisationstransformator mit einstellbaren Eigenmoden der Polarisationselemente", in which a comparable physical process is described. According to this the minimal required number of comb electrode pairs for full mode conversion under arbitrary phase equals three whereas larger numbers, e.g., four to six, result in a larger tolerance with respect to nonideal realization.

Additional waveguide sections with differential phase shift and differential group delay between two principal states-of-polarization of the waveguide can be provided between the converter cells. The elementary mode converters (short comb pieces) can even be arranged—within wide limits—arbitrarily, as long as, e.g., by a random distribution, it is guaranteed that a sufficiently large number thereof can generated, with respect to a fixed position mode-converted signals distributed over different phases. Disadvantageous is here the larger required number of driving voltages compared to the realization according to F. Heismann, R. Ulrich, "Integrated-optical single-sideband modulator and phase shifter", IEEE J. Quantum Electronics 18(1982)4, pp. 767–771, where just two driving voltages are needed.

According to the principles of the invention a continuous differential phase shift $\phi(t)$ (phase delay / phase modulation) between TE and TM waves is generated in the region corresponding to the signal input (IN) of the chip. These TE and TM waves are principal states-of-polarization of the chip, i.e., they are those orthogonal polarizations between which a maximum group delay difference exists.

It is essential that $\phi(t)$ is chosen such that the temporal average of its cosine function $\cos(\phi(t))$ and its sine function $\sin(\phi(t))$ vanishes at least approximately.

In the first embodiment of the invention a first differential TE-TM phase modulator PH1 is provided in the region of input IN of the chip and a second differential TE-TM phase modulator PH2 is provided in the region of output OUT.

A periodic voltage VP1 is applied to phase modulator PH1 and results in a differential TE-TM phase modulation with a temporally variable modulation angle $\phi$, the phase shift between TE and TM waves.

Using electro-optical coefficients r33 and r13, electrode and waveguide geometry and overlap integral between electrical field and optical TE and TM mode, respectively, the proportionality constant V1 between time-dependent modulation angle $\phi(t)$, also called phase delay or modulation angle function, and needed modulator driving voltage (phase shifter voltage) VP1=V1*$\phi(t)$ can be calculated. Since the linear electro-optic coefficients r33 and r13 dominate a proportional relation between VP1 and $\phi$ can be expected in very good agreement. The full calculation is explained for those skilled in the art in Appl. Phys. Lett. 47(11), 1st Dec. 1985, pp. 1137–39. Even in other materials the phase shifting effect can be calculated in similar manner, but it can also simply be measured in any case.

Figure 5:
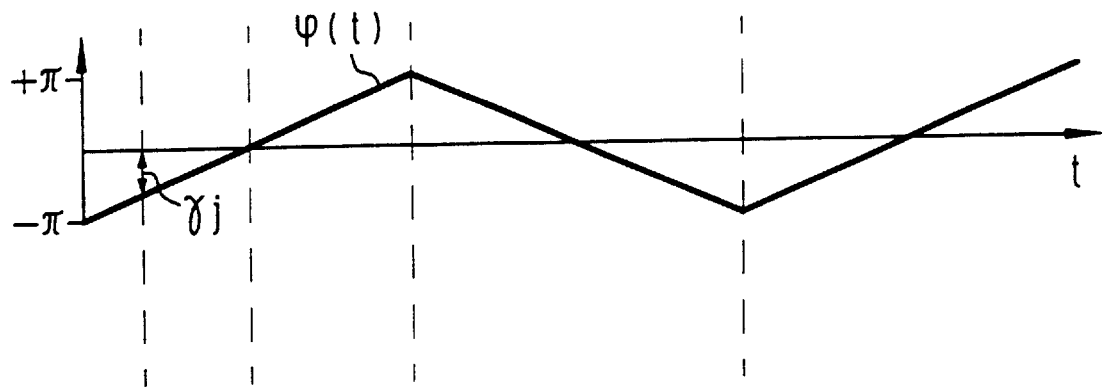
FIG. 5 is a time diagram of the modulation angle function.

A useful measure is to drive the TE-TM phase modulator by a triangular voltage VP1=V1*$\phi(t)$ which due to the electro-optical effect causes a likewise triangular differential TE-TM phase modulation with phase delay $\phi(t)$ where the maximum phase difference between TE and TM waves equals ±π or 2π (or a multiple thereof). For this modulation angle function $\phi(t)$ VP1 is free of a DC component (FIG. 5). However, modulator driving voltages VP1=V1*$\phi(t)$+C are likewise possible.

The only disadvantage of the TE-TM phase modulator is that it generates PMD (polarization mode dispersion) also itself if realized on a birefringent substrate, whereby the PMD compensation range of the arrangement is slightly reduced.

The two electrodes of TE-TM converter cells have up to now been driven by DC voltages which can be expressed by V1j=Vxj*cos(γj) and V2j=Vyj*cos(γj−αj) and V2j=Vyj*sin (γj), respectively (j=index of TE-TM converter cell Pj, FIG. 1). αj is an angle which will be explained later. Values Vxj and Vyj have to be chosen inversely proportional to the respective teeth number of electrodes E1J and E2j, respectively.

According to the principles of the invention converter driving voltages V1j=Vxj*cos(γj−$\phi(t)$) and V2j=Vyj*cos (yj−αj−$\phi(t)$), respectively are used rather than the DC voltages used above, and angle functions cos($\phi(t)$) and sin($\phi(t)$) must be chosen with time averages equal to zero, for which purpose $\phi(t)$ is varied continuously as a function of time in appropriate manner. E.g., by means of a stored lookup table by a digital-to-analog converter a phase shift $\phi(t)$, essentially continuous with exception of quantization errors and triangular in shape, can be generated ("continuous" has to be understood in this sense for all functions), so that a differential phase modulation with a maximum modulation angle $\phi$ of ±π results (FIG. 5).

Figure 6:
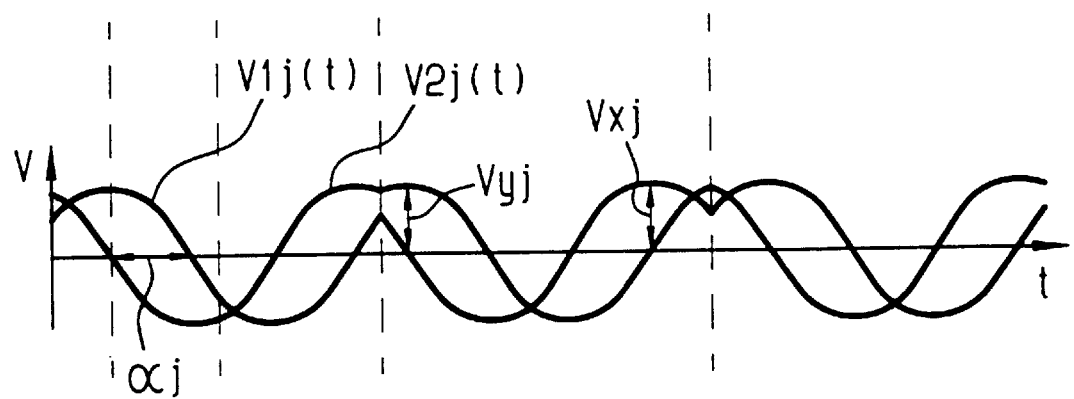
FIG. 6 is a time diagram of converter driving voltages.

In FIG. 6 the behavior of converter driving voltages V1j and V2j, which are functions of phase shift $\phi(t)$, is displayed as a function of time given on time axis "t". Converter driving voltages V1j and V2j are composed in the case of the chosen triangular phase shift $\phi(t)$ from adjacent full cosine or sine periods. For an angle (γj−$\phi(t)$)=0 it is cos(γj−$\phi(t)$)=1, where converter driving voltage V1j reaches its maximum. The time averages are free of DC components so that electrodes E1J and E2j operate free of DC drift. Depending on the definition of the differential phase shift $\phi(t)$ a positive or a negative proportionality constant V1 can result.

(Rather than a chosen phase shifter voltage VP1=V1*$\phi(t)$ a voltage VP1+C shifted by a constant C can always be chosen which would result from use of a phase angle $\phi(t)$+C/V1, because if the functions cos($\phi(t)$) and sin($\phi(t)$) have vanishing time averages then this is also the case for the functions cos($\phi(t)$+C/V1) and sin($\phi(t)$+C/V1). However, since the zero-point of angle $\phi(t)$ can be chosen at arbitrarily anyway the description VP1=V1*$\phi(\phi(t)$ appears to be sufficient.)

The perturbation of the polarization mode dispersion compensation by the TE-TM phase modulator can be avoided or compensated exactly if these TE-TM converter driving voltages are used rather than the usual constant voltage signals. These modified signals are under the simplifying assumption of constant amplitudes of converter driving voltages (electrode voltages) V1j, V2j and of constant phase angle γj free of DC component which means the TE-TM converters operate free of DC drift.

It must be added that converter cells with equal effective lengths (equal number of electrode teeth) can also be operated with equal maximum converter voltages. Normally the teeth number of electrodes E1J and E2j is chosen equally large. In this case it can be chosen Vxj=Vyj=V0j. The following description assumes such symmetrical implementation.

Converter voltages and phase angles can be changed for the purpose of polarization transformation and/or PMD compensation. Generally there is no correlation between the required time-dependent variations and function $\phi(t)$.

Instead of a triangular signal any other continuous time-dependent signal can be chosen for driving the phase modulator if the temporal averages of trigonometric functions cos($\phi(t)$) and sin($\phi(t)$) vanish, for example an asymmetric triangular function, or a sine wave having a peak angle of ±2,4 radians or else a rounded rectangular voltage or trapezoidal voltage with a differential TE-TM phase modulation of a peak angle of slightly more than ±π/2. The latter embodiment has the advantage that the required voltage VP1 or the length of TE-TM phase modulators PH1, PH2 is minimum.

The frequency of phase retardation $\phi(t)$ can be any value, in principle. Useful frequencies lie in the range from 1 μHz (microhertz) to 1 MHz (megahertz). However, least disturbance of the PMD compensation is generally obtained if the frequency is chosen fairly small. It must be just as large as to avoid DC drift effects during one period. Preferably small frequencies in the range from 1 $\mu$Hz (microhertz) to 1 kHz (kilohertz) should be used therefore.

In order to obtain an output state-of-polarization that is independent of the phase retardation $\phi(t)$ a second TE-TM phase modulator PH2 is provided at the output of the chip according to FIG. 1, which generates a differential TE-TM phase modulation with modulation angle function $-\phi(t)$. Since the ground electrode of the second TE-TM phase modulator in this embodiment is situated at the opposite side of the waveguide when compared to the one at the input the phase modulator at the output can—equal length assumed as for the phase modulator at the input—be driven by the same voltage VP2=VP1. Due to the second differential TE-TM phase modulator PH2 constant output state-of-polarization can be maintained in spite of differential phase modulation and modulated converter driving voltages. This can be of interest if orthogonally polarized signal are transmitted in a polarization multiplex scheme. If, in contrast, the output state-of-polarization does not need to be independent of $\phi(t)$, and this is the case in many applications, the second differential TE-TM phase modulator PH2 at the chip output can be omitted.

If signals are transmitted in a polarization multiplex transmission scheme the PMD influences on the different polarizations can be compensated together or the necessary adaptation of the received to the needed polarizations can be performed together. The separation of the polarized signals takes place at the output of the compensator unit. But even without second phase modulator PH2 the arrangement can generate certain constant output states-of-polarization, TE or TM to be specific. Therefore polarization multiplex operation is also possible without the second phase modulator at the output. These polarizations are demultiplexed at the chip output, for example by means of a TE-TM beamsplitter PBS integrated on the chip.

Figure 2:
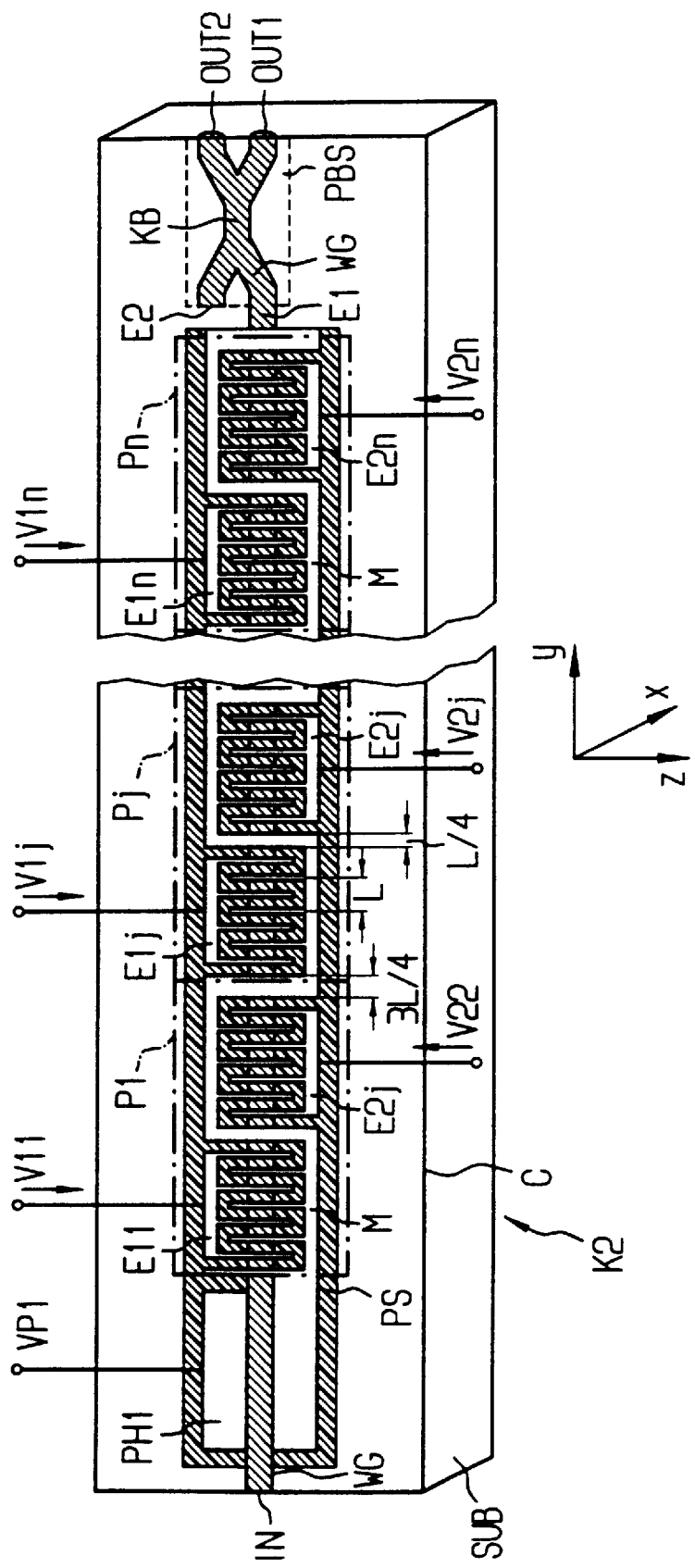
FIG. 2 is a similar view of a PMD compensator with polarization beamsplitter.

A corresponding embodiment of the invention is shown in FIG. 2. Except for the TE-TM polarization beamsplitter PBS in the output region of the chip FIG. 2 is identical to FIG. 1. The polarization beamsplitter is implemented as an optical directional coupler with two inputs E1, E2 and two outputs OUT1, OUT2. The directional coupler structure is again defined by waveguides WG. One input E1 is coupled to the actual polarization transformer or PMD compensator. In the coupling region KB of the polarization beamsplitter lightwaves are coupled, in which process TE and TM waves are coupled differently due to their different mode fields ant due to the crystal birefringence. For suitable dimensioning one state-of-polarization, e.g., TE appears at one output OUT1 whereas at the other output OUT2 the orthogonal state-of-polarization appears. At outputs OUT1 and OUT2 two optical receivers can be connected. It is possible to provide there more polarizers in order to improve the extinction ratio of the unwanted state-of-polarization with respect to the desired state-of-polarization at the respective output.

Figure 19:
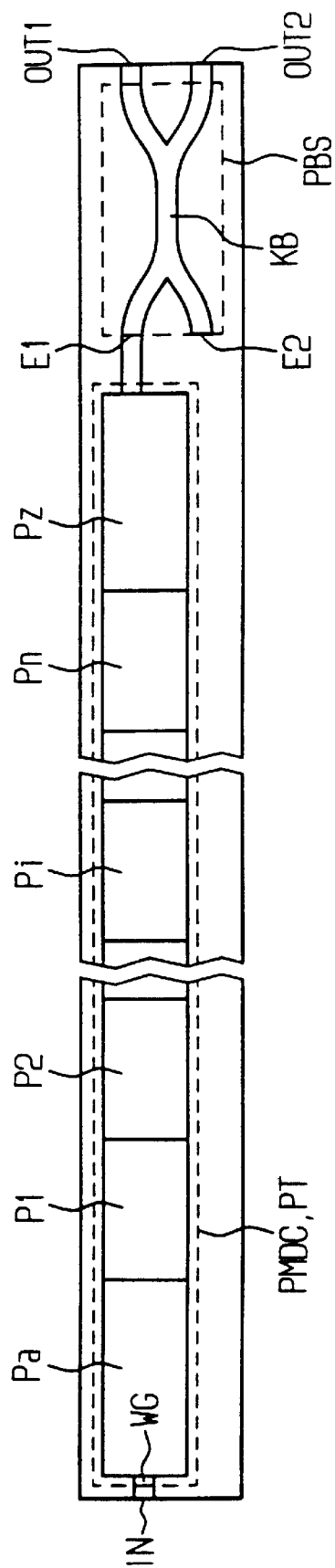
FIG. 19 is a diagrammatic side view of the architecture principle of a polarization transformer embodying the principles of the invention with subsequent polarization beamsplitter.

Further embodiments can also be completed to be a PMD-compensator and polarization demultiplexer by means of a polarization beamsplitter at the output. According to the principles of the invention any DC drift-free polarization transformer PT or DC drift-free PMD compensator PMDC can be advantageously enhanced for the purpose of polarization splitting by a polarization beamsplitter PBS. Schematically this is depicted in FIG. 19. These parts can but need not be integrated together on a substrate SUB. As a PMD compensator PMDC or polarization transformer PT of FIG. 19 in particular the embodiments described by reference to FIGS. 1, 4, 7, 8, 11, 12 and 13 can be inserted.

Any PMD compensator is at the same time also a polarization transformer. In order to achieve on one hand the desired PMD compensation and on the other hand the desired polarization transformation until input E1 of polarization beamsplitter PBS it is useful to drive parts of the PMD compensator situated near to this polarization beamsplitter PBS preferably for the purpose of polarization transformation for polarization demultiplex while parts of the PMD compensator situated further away, i.e., situated nearer to input IN, are preferably driven for the purpose of PMD compensation. Driving of these parts according to the principles of the invention for avoiding DC drift is applied additionally.

Figure 7:
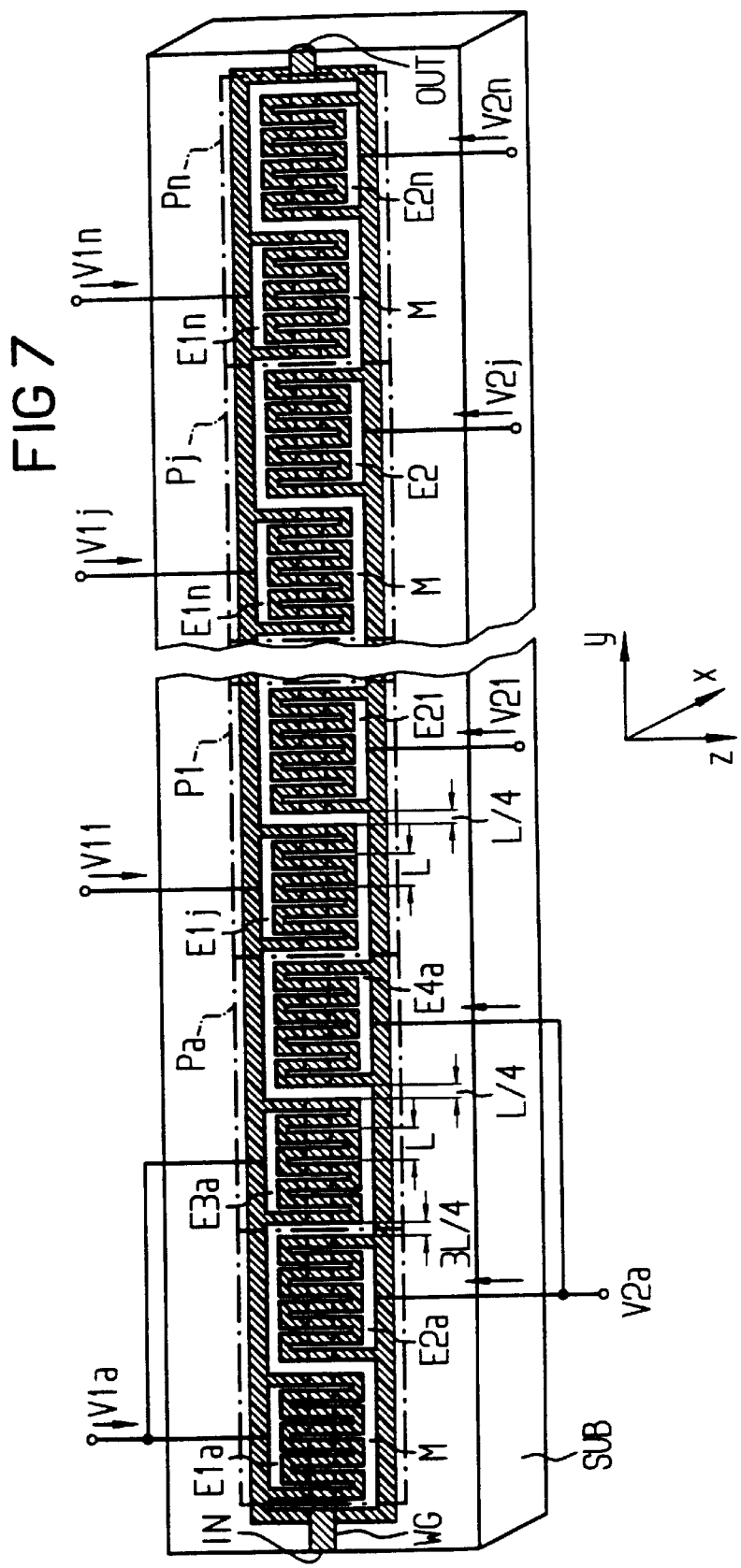
FIG. 7 is perspective diagram of a variant with a converter cell.
Figure 8:
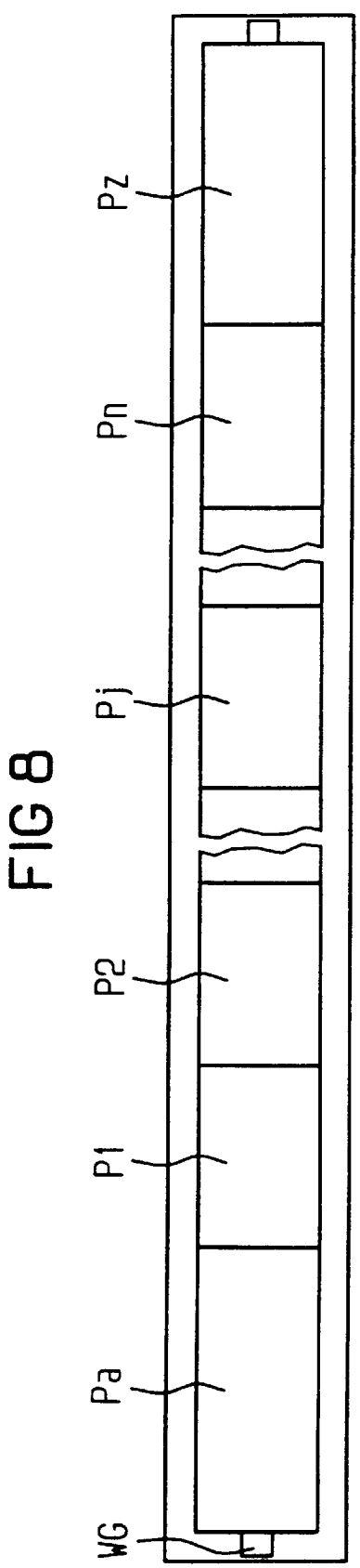
FIG. 8 is a diagrammatic side view of the schematic principle with converter cells.

Embodiments of polarization beamsplitters PBS can be found in FIG. 7 of the publication H. Herrmann et al., D. A. Smith, W. Sohler, "Integrated optical, acoustically tunable wavelength filters and switches and their network applications", Proc. ECIO 1993, Neuchâtel, Switzerland, pp. 10-1 to 10-3 as well as in the publications cited therein. In particular proton-exchanged waveguides can replace coupling region KB.

In the case Vxj=Vyj=V0j the converter driving voltages Vij (i=1, 2; j=1, 2 . . . , n) can, according to the driving voltages that have already been expressed generally, be expressed in the form V1j=V0j*cos(($\gamma$j–$\phi$(t))) and V2j=V0j*cos($\gamma$j–$\alpha$j–$\phi$(t)), respectively. In doing so the amplitude of V0j determines the strength of TE-TM mode conversion. Since between neighboring mode converter electrodes there is in each case ¼ or ¾ of a beat length as an additional space geometrical considerations result in $\alpha$j=±$\pi$/2 for this embodiment. Quantity $\gamma$j can, just as V0j, be modified in the course of time, in order to take into account the requirements of polarization transformation or PMD compensation. Phase ($\gamma$j–$\phi$(t)) or ($\gamma$j–$\alpha$j–$\phi$(t)) under which the respective TE-TM mode conversion occurs changes—due to time-dependent $\phi$(t) in time-variable manner—just opposite to the differential TE-TM phase modulation with angle $\phi$(t) generated by the phase modulator situated at the input. In short words the effects cased by the alternating voltages do not alter the PMD of the compensator unit and therefore neither the PMD compensation function because they cancel in this respect. (The phase modulation at the input corresponds to a length change at the input. A change of the mode converter voltages corresponds to a longitudinal shifting of the electrodes. If the longitudinal electrode shifting is just opposite to the length change at the input the electrodes stay with respect to the chip input preceding the phase modulator at the same place which means that also the polarization transformation and the PMD of the compensator and hence the PMD compensation stay the same.)

Several TE-TM mode converter cells can, in addition to the desired mode conversion, also generate a differential TE-TM phase modulation since they act as a general elliptical retarder. The phase shift (phase modulation) $\phi$(t) generated at the chip input by the differential TE-TM phase shifter can, in special cases or under the influence of practical shortcomings of various kinds, already have been compensated which means that driving voltages of converter cells situated behind can not be chosen DC component-free. In order to avoid this effect several differential TE-TM phase modulators can be provided (this corresponds to a cascade of several compensators of FIG. 1).

For very small frequencies of phase modulation $\phi$(t) it is not necessary to drive all TE-TM converter cells by voltages $V0j*\cos(\gamma j-\phi(t))$ and $V0j*\cos(\gamma j-\alpha j-\phi(t))$, respectively. Driving some or even all converter cells can rather be left to a control unit which at the same time controls polarization or compensates for PMD. Choosing the converter voltages in the previously described form is preferred, however, because this achieves both the goal of PMD compensation and the goal of DC component-free driving voltages without any compromises.

Alternatively it is possible to impress voltages of the form $V0j*\cos(\gamma j-\phi(t))$ and $V0j*\cos(\gamma j-\alpha j-\phi(t))$, respectively, to the converter cells with exception of those situated in the front of the chip near the input while doing without TE-TM phase modulator. The TE-TM converters in the front must now—controlled by the control algorithm—generate a differential TE-TM phase modulation with angle $\phi(t)$.

In yet another embodiment FIG. 7 of the invention a possibility to generate a differential TE-TM phase shift $\phi(t)$ by means of a TE-TM converter or TE-TM converter cells is exploited. It consists in adding a TE-TM converter Pa at the chip input (FIG. 7) and—in the case of a need not only for unchanged PMD but also for unchanged polarization transformations—another such TE-TM converter Pz at the chip output (FIG. 8), both of which are driven by special DC component-free driving voltages. In the embodiment of FIG. 7 a TE-TM converter according to F. Heismann, R. Ulrich, "Integrated-optical single-sideband modulator and phase shifter", IEEE J. Quantum Electronics 18(1982)4, pp. 767–771, is employed which needs just two driving voltages. In a preferred embodiment each converter cell Pa, Pz exerts full mode conversion, whereby constant voltages Vxa, Vya are defined. The converter electrodes receive driving voltages $V1a=Vxa*\cos(\gamma a-\phi(t)/2)$ and $V2a=Vya*\cos(\gamma a-\alpha a-\phi(t)/2)$, respectively. These are linear functions of phase-shifted cosine functions $\cos(\gamma a-\phi(t)/2)$, $\cos(\gamma a-\alpha a-\phi(t)/2)$ of one half $\phi(t)/2$ of the differential phase shift ($\phi(t)$). Since the eigenmodes of mode converter Pa in this embodiment take places at an angle coordinate $\phi(t)/2$ on the S2–S3 great circle of the Poincaré sphere it is ascertained that a differential phase modulation $\phi(t)$ between TE and TM principal states-of-polarization of the lithium niobate chip with X cut and Y propagation occurs according to the principles of the invention. Angles $\alpha xa$ and $\gamma a$ follow as explained above from the electrode geometry and the distance of converter Pa to the other converters.

Of course there are many more possibilities to generate a differential phase modulation. In the above-mentioned embodiment several cascaded rather than on differential phasen modulator could be employed, the differential phase modulations of which add to the value $\phi(t)$.

In this last embodiment with TE-TM mode converters cascading several such mode converters with full mode conversion each is also possible, in which case the differential phase shifting effects add with alternately positive and negative sign. TE-TM mode converters with other than full mode conversion can also be cascaded in which case the retardations add for equal TE-TM phase shift angles. Finally the combination of TE-TM phase modulators and TE-TM mode converters for the generation of differential TE-TM phase modulation is also possible.

Beside the above-mentioned embodiments of the differential TE-TM phase shift $\phi(t)$ (e.g., a triangular signal) its generation by TE-TM converters is particularly suited to choose for $\phi(t)$ a linear function of time so that $\phi(t)=\Omega*t$, where $\Omega$ is a constant angular frequency. This is preferably chosen low compared to the frequencies of typical polarization changes that need to be compensated for; small frequencies in the range from 1 $\mu$Hz to 1 kHz should therefore preferably be employed.

If a output state-of-polarization that is independent of the time-dependent differential phase shift $\phi(t)$ is sought a TE-TM phase modulator PH2 at the chip output according to FIG. 1 can be provided, but equally there converters Pz with full mode conversion and voltages as explained above can follow the last regular converter cell.

Dependent on the embodiment it can be necessary to change the driving voltages (V1j, V2j) of the regular converter cells compared to an embodiment of the polarization transformer without differential phase shift $\phi(t)$ within the frame given by the control range. E.g., the TE-TM converter 1 behind the converter Pa situated at the input and the TE-TM converter n situated in front of the converter Pz that is situated at the output are driven such that they exert full mode conversion if in absence of converters Pa, Pz they should exert no mode conversion, and vice versa.

All embodiments of the invention function also in the case that polarization mode dispersion can be neglected and that the drift-free polarization transformer is merely used for generating a particular output from a given input state-of-polarization.

Most embodiments function also in the case of simple substitutions widely used in the field of electrical engineering, such as addition of constant signals or phase angles or changes of signs of phase angles or signals.

Figure 3:
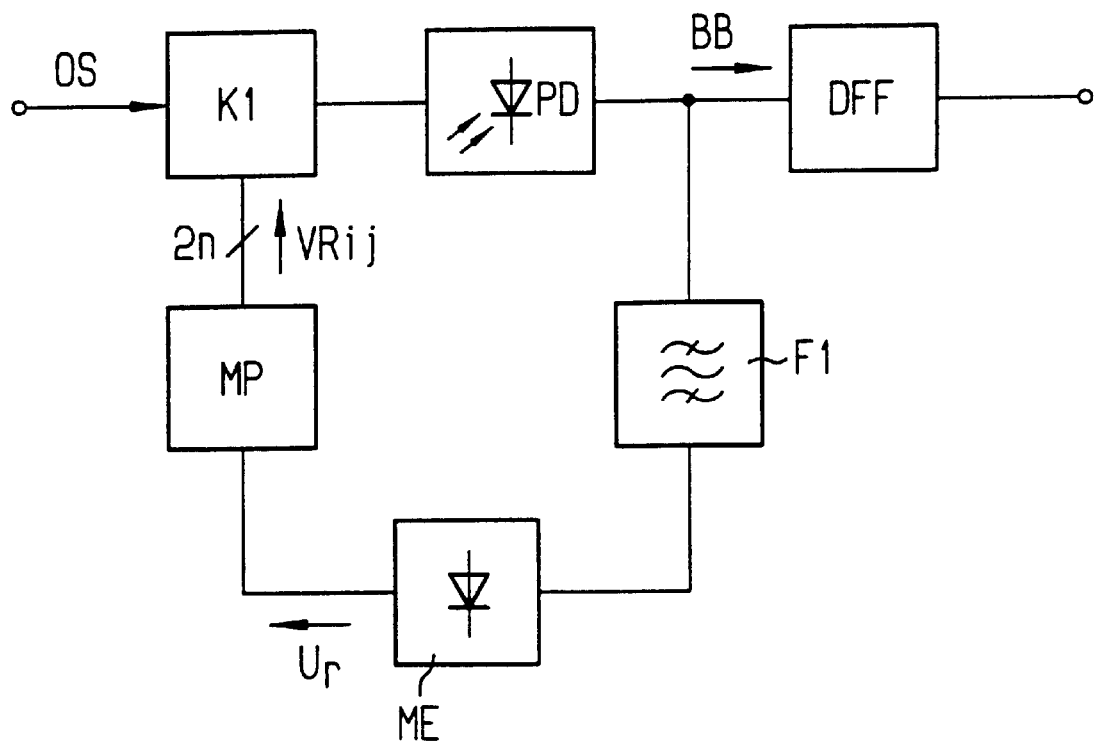
FIG. 3 is a block diagram of a control unit for PMD compensation.

In FIG. 3 the schematic of a control unit is depicted. An optical signal OS is fed into a receiving terminal RX. It passes a PMD compensator K1 and is thereafter detected in a photodiode PD followed by a decision circuit DFF. The baseband signal BB at the output of the photodiode is fed via a bandpass filter FI into a measurement unit BB, e.g., a rectifier, which controls via controller MP by means of driving voltages Vij the PMD compensator.

The actual PMD compensation takes place by variation of the amplitude values of Vij (Vxj and Vyj) or V0j, respectively, and the phase angles $\gamma j$. Due to the compensatory action a transitory deviation from the ideal of a DC component-free driving voltage/electrode voltage can occur. Of course deviations of permissible amount from the ideal of a DC drift-free driving voltage are likewise possible. In general such deviations can be neglected in the compensatory action.

Whether Vxj and Vyj (or V0j, respectively) and $\gamma j$ are varied when performing PMD compensation, i.e, parameters which influence two converter voltages V1j and V2j together, or whether for this purpose simply the converter voltages V1j and V2j themselves are varied individually is not important, just as it does not matter whether a complex number is expressed by magnitude and angle or real and imaginary parts.

In the simplest case one electrode voltage is initially varies, during which process the rectified output voltage U1 measured at the bandpass filter FI that is centered at half the clock frequency acts as a quality criterion.

To go into detail, PMD compensation is brought about by tentatively changing one or both electrode voltages of a converter cell by given quantities. Rectified output voltage U1 of filter F1 is subsequently measured. If after a change of electrode voltage(s) this voltage U1 is improved then this change is kept or an additional change in the same direction is performed. If it diminishes, however, the change is taken back or even replace by a change from the origin opposed to the direction of the original change. The other electrode voltages are optimized thereafter.

It may be useful to initially optimize every second, fourth, eighteenth or sixteenth electrode voltage because this compensates as fast as possible for the particularly detrimental low-order PMD components. This procedure is repeated cyclically until the optimum is reached.

The maximum is reached if the eye opening of the baseband signal is maximum, i.e, if the signal is transmitted without distortion. Rectified voltage U1 serves as a measure for this.

Alternatively to this the electrode voltage(s) can be tentatively changed in both directions. The differences of rectified voltage U1 allow to approximately determine the gradient of this rectified voltage U1, and then allows to change the electrode voltages in direction of the gradient so as to make it approach a maximum of voltage U1.

The cyclical repetition of the control scheme can make it useful to initially reduce the magnitudes of the electrode voltages to be optimized since trespassing of the permissible electrode voltage magnitudes can be prevented thereby. In addition or as an alternative to this the electrode voltage can be limited each time it is controlled.

Figure 4:
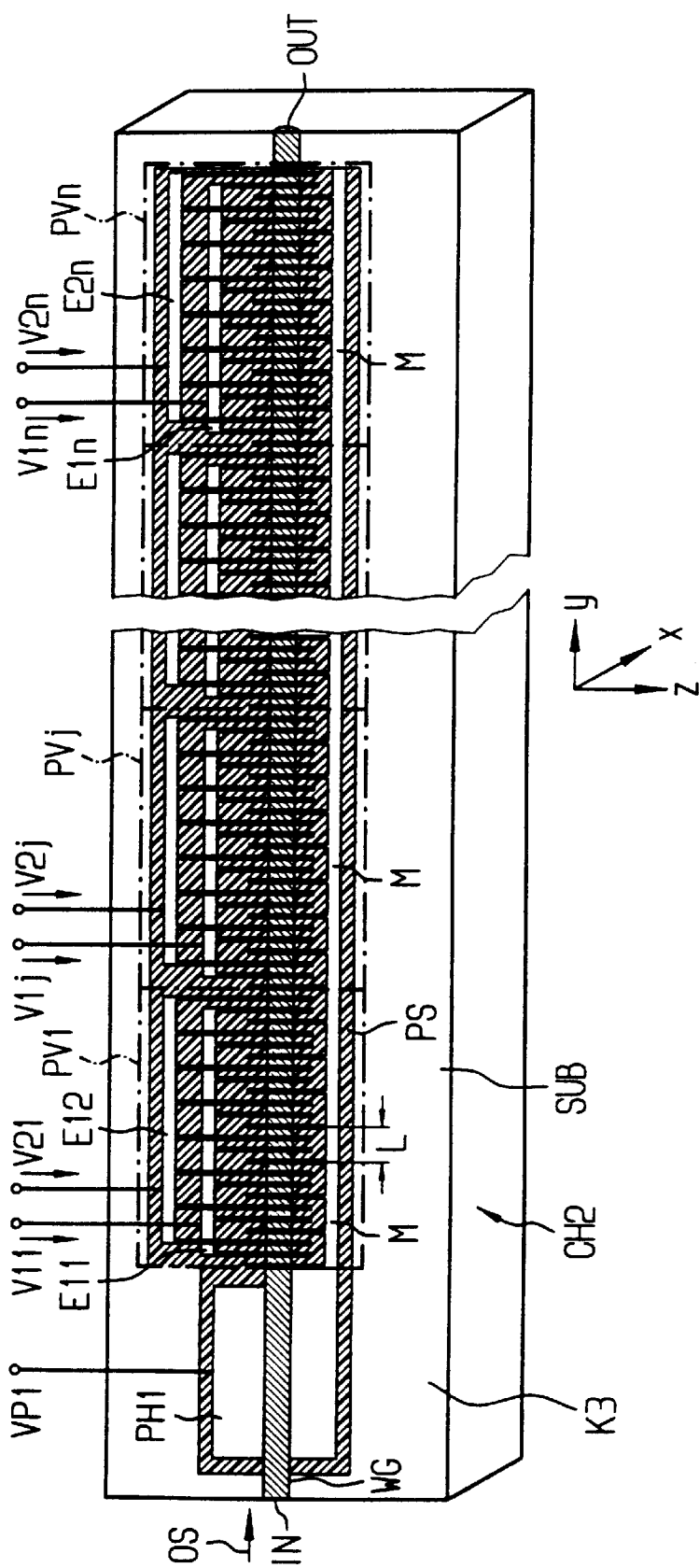
FIG. 4 is a perspective diagram of a further exemplary compensator embodying the principles of the invention.

If one is prepared to accept a more complicated wiring on the chip, for example crossings of electrical lines making use of isolating buffer layers compensator variant K3 can be realized according to FIG. 4. Here the teeth of mode converter electrodes E11 and E21; E12 and E22, ... until E1n and E2n are placed in each case one after the other between two teeth of ground electrode M and form converter cells PVj. For equal maximal strengths of the electrical fields which are limited by material constants this variant can perform polarization transformations in a somewhat shorter length than the polarization transformer according to FIG. 1, and therefore offers a larger variability of polarization transformations for equal total chip length. In addition, due to the smaller electrode gaps the electrode voltages needed to generate a certain field strength are smaller.

The electrode teeth periodicity continues to be L, teeth widths and gaps are roughly L/6. The necessity of introducing spaces of L/4 and 3L/4 disappears. A single TE-TM phase modulator PH1 is provided at the chip input. For electrode driving voltages $V1j=V0j*\cos(\gamma j-\phi(t))$ and $V2j=V0j*\cos(\gamma j-\alpha j-\phi(t))$, respectively, are again used. Since electrodes follow in distances equal to ⅓ of a beat length it is geometrically determined $\alpha j=\pm\pi/3$ in this embodiment. Here V0j again determines the strength of TE-TM mode conversion. Quantity γj may just like V0j be varied in the course of time in order to accommodate the necessities of PMD compensation.

Figure 17:
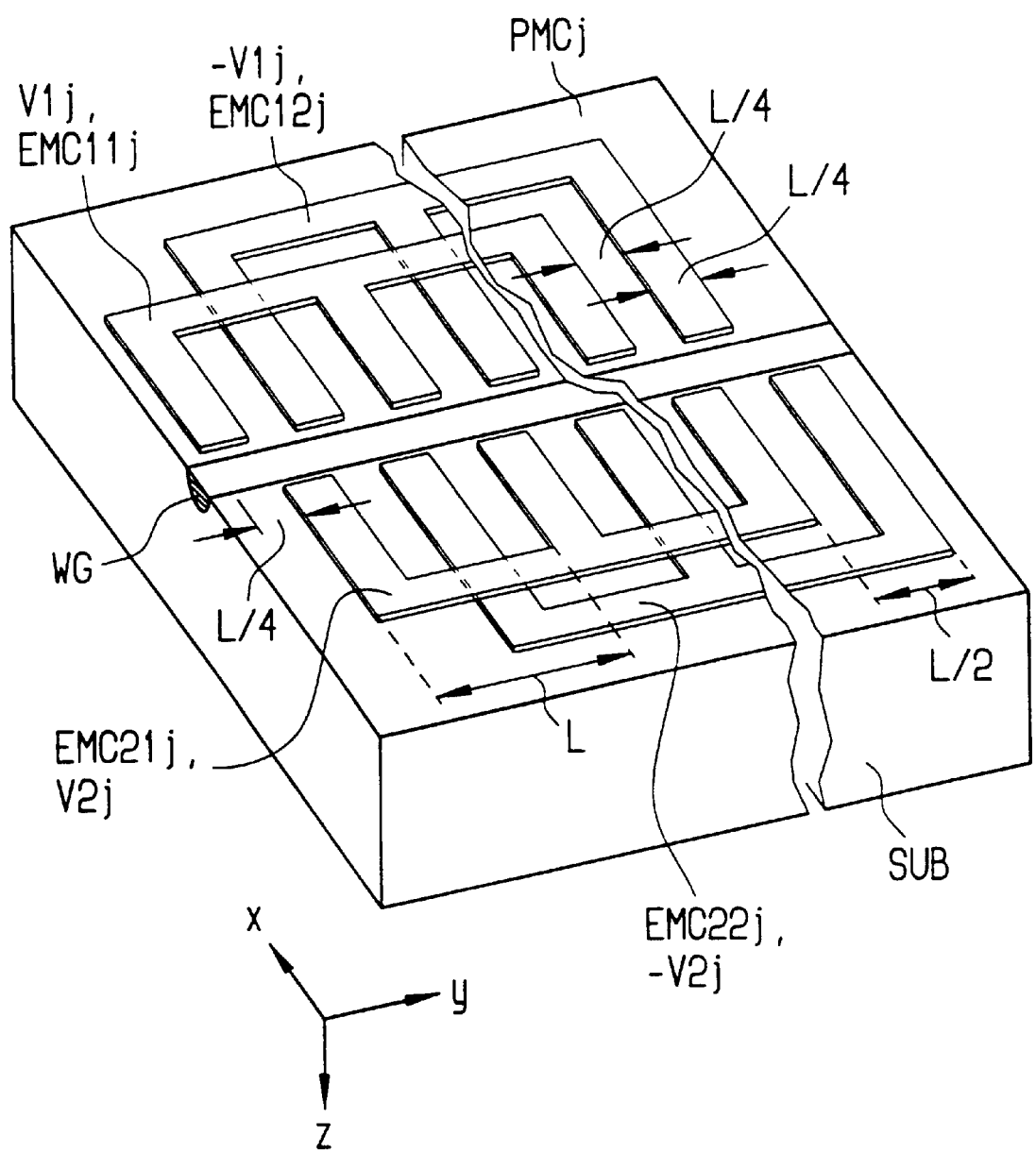
FIG. 17 is a perspective view of a mode converter or mode converter cell.

Besides X cut, Y propagation of a lithium niobate crystal many other embodiments can be chosen, for example embodiments in semiconductors. Likewise, lithium niobate with Z cut and Y propagation may be used. Compared to the above-described embodiments crystallographic X and Z axes are exchanged in this embodiment. Rather than periodic vertical (parallel to X direction) fields periodic horizontal (again parallel to X direction) fields must now be applied. Such a mode converter or mode converter cell PMCj is depicted in FIG. 17. Between chip surface and electrodes and also between electrodes the usual isolating buffer layers may be deposited. On either side of waveguide WG comb-shaped electrodes EMC11j, EMC12j, EMC21j, EMC22j are provided. Electrodes EMC1lj, EMC12j at one side receive mode converter voltages V1j and −V1j, respectively. Electrodes EMC21j, EMC22j at the other side receive voltages V2j and −V2j, respectively. These are shifted with respect to the electrodes at the previously mentioned side of the waveguide by a quarter L/4 of one beat length L in propagation direction Y. Electrode gaps at one side of the waveguide and electrode widths approximately equal L/4. The two comb-shaped electrodes of either side are isolated by isolating buffer layers at the crossing points, exhibit periods of one beat length L each and are shifted with respect to each other by one half L/2 of one beat length L. By moden converter voltages V1j and V2j and their dependent inverted voltages −V1j, −V2j (i.e., those voltages just opposed to voltages V1j and V2j) mode conversion in phase and in quadrature can be exerted which allows for endless polarization transformation and PMD compensation. In this embodiment angle α equals 90°. This mode converter or mode converter cell can replace mode converter (cells) P1 ... Pz, Pa, Pz in the previously-mentioned embodiments. This is true not only for embodiments with leading and possibly trailing mode converters Pa, Pz or differential phase shifters PH1, PH2, but also for polarization transformers and PMD compensators that are immune to DC drift and do not need such arrangements. Embodiments with, e.g., α=120° or α=60° are also conceivable by using other electrode configurations.

Figure 18:
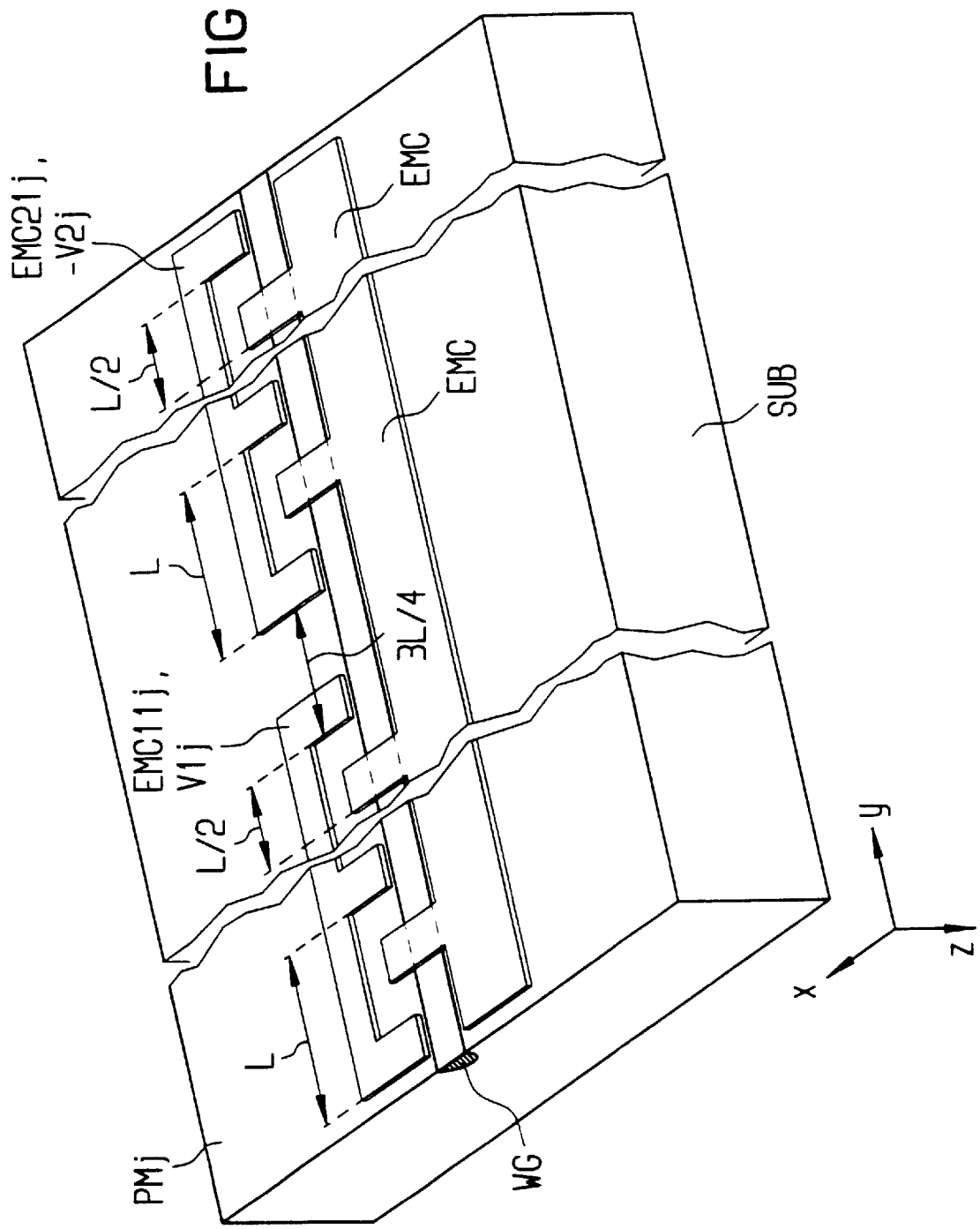
FIG. 18 is a perspective view of another mode converter or mode converter cell.

In yet another embodiment of FIG. 18 one of the mode converter electrodes at one side of the waveguide is omitted. At the other side both electrodes are replaced by a ground electrode EMC which likewise may be comb-shaped. This embodiment of a mode converter PMj likewise allows for mode conversion in both quadratures, but only due to the fact that in addition to a first mode converter electrode EMC11j with voltage V1j there is provided also a second mode converter electrode EMC21j with voltage V2j. The two electrodes are shifted with respect to each other by an odd multiple 3L/4 of a quarter L/4 of one beat length L in propagation direction Y on a chip SUB, just as depicted in FIG. 1 for a case with somewhat differently shaped electrodes E1J, E2j (j=1 ... n). For achievement of large mode conversion degrees in phase and in quadrature several or many mode converter cells PMj have to be cascaded.

While the above-mentioned embodiments incorporate polarization transformers with TE- and TM principal states-of-polarization, and mode converters capable of converting these TE and TM into each other we will now discuss embodiments for which mode-convertible and principal states-of-polarization are right and left circular states-of-polarization. The states-of-polarization which are converted by a mode converter are in each case also principal states-of-polarization of the birefringent waveguide connecting the mode converters.

In IEEE J. Lightwave Techn. 6(1988)7, pp. 1199–1207 a polarization transformer is described which is realized on a non-birefringent substrate material. This polarization transformer can transform any incident state-of-polarization endlessly into circular state-of-polarization or vice versa, and possesses a very small retardation the maximum of which needs to be only π, ideally. It operates as a mode converter for circular states-of-polarization, while the phase delay between these circular states-of-polarization can be chosen arbitrarily and endlessly. The possible eigenmodes of this polarization transformer are linear states-of-polarization.

Similar polarization transformers are found in IEEE J. Lightwave Techn. 8(1990), S. 438–458 and IEEE Photon. Techn. Lett. 4(1992), S. 503–505. These latter possess retardations of 2π or more if the retardations of the individual sections are added but are capable of transforming any into any other state-of-polarization.

In Proc. Optical Fiber Communications Conference and International Conference on Integrated Optics and Optical Fiber Communications (OFC/IOOC '99), post-deadline paper volume, PD29, San Diego, Feb. 21–26, 1999 it has been reported that PMD-compensators can be constructed from a cascade of differential group delay sections, that polarization transformers situated in between must be capable of transforming any state-of-polarization into a principal state-of-polarization of the subsequent differential group delay section.

As delay sections birefringent optical fibers (such as PANDA fiber) can be used for example which have linear principal states-of-polarization.

According to the principles of the invention a mode converter of circular states-of-polarization is followed by a quarterwave plate. If desired another quarterwave plate precedes it. A polarization transformer is thereby composed which can transform linear states-of-polarization with ±45° azimuth angle into each other.

By cascading several such polarization transformers, separated and, in the case of the last polarization transformer, followed by polarization-maintaining optical fibers oriented such that ±45° azimuth angle of the linear principal states-of-polarization is achieved and exhibiting differential group delays between these principal states-of-polarization, a simple polarization mode dispersion compensator is composed.

In the region of mode converters of circular states-of-polarization, however, these principal states-of-polarization of preceding and/or following polarization mode dispersive elements are circular.

Figure 9:
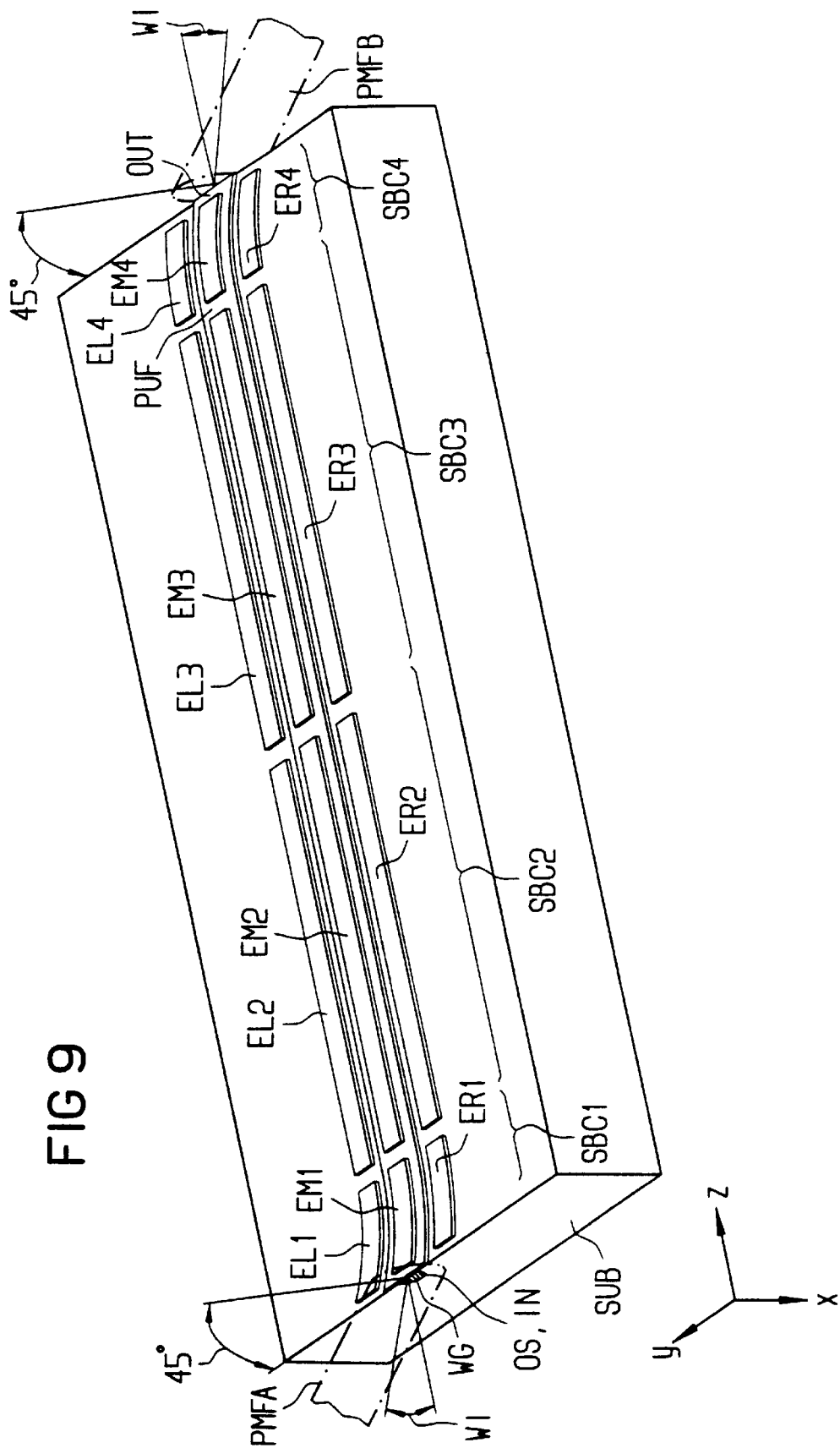
FIG. 9 is a perspective view illustrating an architecture principle of a polarization transformer embodying the principles of the invention.
Figure 10:
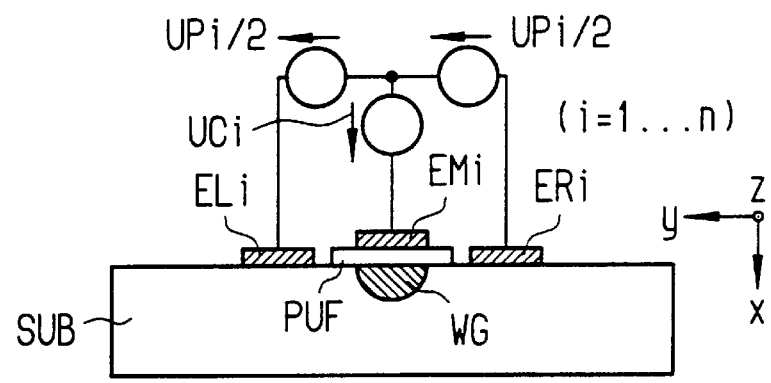
FIG. 10 is a diagrammatic cross-sectional view of a polarization transformer of FIG. 9.

In an embodiment according to FIG. 9 (cross-section: FIG. 10) the polarization transformer consists of a lithium niobate crystal with X cut and Z propagation.

By indiffusion of titanium a waveguide WG has been produced. On top of the crystal an isolating buffer layer PUF may—but need not—be provided, for example composed of silicon dioxide. Just like the crystal it is transparent at the operating wavelength. On top of the buffer layer or on the crystal conductive electrodes ELi, EMi, ERi (i=1 . . . n) are deposited. Let n=4 here, but other values are also possible. These electrodes can consist of metal, e.g., aluminum, but can also consist of transparent conductive materials such as indium tin oxide (ITO). In this embodiment the buffer layer PUF is present only under the center electrode. This has the advantage that fields which exist only between the outer electrodes ELi, ERi are not subject to DC drift. An increased attenuation due to electrode conductivity does not or does only to a very small degree take place because the optical wave has decayed already very much in the region of the outer electrodes ELi, ERi.

Electrodes ELi, EMi, ERi are segmented so that 4 polarization control elements SBCi (i=1 . . . 4) are provided. Center electrodes EMi are placed on top of the waveguide, left and right electrodes ELi, ERi are placed parallel at either side of waveguide WG. Individual electrodes of different segments can also be connected to each other, e.g., all electrodes EMi. Application of opposed voltages UPi (i=1 . . . 4) between outer electrodes ERi, ELi generates a differential phase shift between transverse electric (TE) and transverse magnetic (TM) waves. Due to unavoidable waveguide birefringence non-zero values UPi0 of voltages UPi are generally needed for phase matching, i.e., vanishing TE-TM phase shift. Rather than using Z propagation other propagation directions can also be used which are near the Z axis within some degrees because waveguide birefringence can be approximately eliminated with help of such a little-birefringent crystal cut. In general voltage values UPi0 unequal zero are still needed for phase matching because this compensation is generally incomplete.

If equally poled voltages UCi (i=1 . . . 4) are applied to the outer electrodes ELi, ERi with respect to the center electrode EMi TE-TM mode conversion is achieved. For vanishing voltage UCi this mode conversion is ideally zero but even a small lateral shift of the electrodes in Y direction can make a voltage UCI0 necessary for this purpose.

Combination of opposed and of equally poled voltages UPi and UCi allows to achieve any combination of TE-TM phase shift and TE-TM mode conversion. Such a polarization control element is called a Soleil-Babinet compensator SBC. Retardation $\psi i$ of SBCi is obtained by geometric addition of TE-TM phase retardation without mode conversion and TE-TM mode conversion without phase retardation, hence $\psi i = sqrt((bb*(UCi-UCi0))^2+(aa*(UPi-UPi0))^2)$. Let retardation $\psi i$ be understood to be positive in the following; negative retardations are expressed by positive ones referred to exchanged eigenmodes. Constants aa, bb are determined by overlap integrals between electrical and optical fields. An SBC operates as a linear optical waveplate of retardation $\psi$ with orthogonal, linearly polarized eigenmodes. The tangent of twice the azimuth angle of one of these eigenmodes is proportional to the ratio $(bb*(UCi-UCi0))/(aa*(UPi-UPi0))$. As has been mentioned before, UCi0 equals zero ideally.

For polarization transformation of a circular into any arbitrary state-of-polarization or vice versa an SBCi may exhibit a retardation $\psi i=0 \ldots \pi$, see IEEE J. Lightwave Techn. 6(1988)7, pp. 1199–1207. Subdivision of an SBC into several SBCs, where the adjustability of the sum of retardations is the same as the adjustability of the retardation of the SBC that has been subdivided, always allows for the desired polarization transformations, likewise. Therefore transformation of a circular into any state-of-polarization or vice versa is also possible using two SBCs with retardations of $0 \ldots \pi/2$ each. In FIG. 9 SBC2 and SBC3 serve to this purpose. At the output a similarly constructed SBC4 is provided. Preferably it operates as a quarterwave plate with eigenmodes that are parallel and perpendicular, respectively, to the chip surface. In order to minimize component length the waveguide is bent by an angle WI inside or shortly before reaching SBC4. This bend, however, can also be omitted. The bend has the advantage that the material birefringence is being made use of which means SBC4 may have a shorter component length than SBC2 or SBC3. In this preferred case a suitable choice of length even allows to do without electrodes for SBC4 because the corresponding waveguide section operates by itself as such a quarterwave plate. In order to compensate for unavoidable inaccuracies—which are generally small in amplitude, however—the shorter electrodes ER4, EM4, EL4 are, however, useful and sufficient. A voltage UP4 allows to adjust the retardation of SBC4 (with 0° and 90° eigenmodes) to the desired value $\psi 4=\pi/2$ or $\psi 4=\pi/2$. Due to the absence of a buffer layer below electrodes ER4, EL4 this voltage is not subjected to DC drift or just subjected to a small DC drift. A voltage UC4 is not needed. Deviations of UC4 and UP4 with respect to these values may temporarily be tolerated for compensation of nonideal behavior of polarization transformers or for other purposes because the time constants of DC drift are very large.

At the output a polarization-maintaining optical fiber PMFB is connected, the principal states-of-polarization (axes) of which exhibit angles of 45° with respect to the chip surface. Since circular states-of-polarization at input of SBC4 is transformed into ±45° state-of-polarization at the end of SBC4 components SBC2, SBC3 operate as a polarization transformer which may be used in a polarization mode dispersion compensator (PMD compensator). For symmetry reasons and for easier drivability of the polarization transformer the chip input is constructed in equal manner. A polarization-maintaining optical fiber PMFA with 45° angles between principal states-of-polarization and chip surface is followed by a short Soleil-Babinet compensator SBC1 oriented with angle WI, the electrodes of which can be omitted if length and angle are chosen for quarterwave plate operation just as for Soleil-Babinet compensator SBC4. Subsequently the Soleil-Babinet compensators SBC2, SBC3 follow. Angle WI between the direction of waveguide WG in the region of SBC2, SBC3 and it direction in SBC1, SBC4 does not complicate coupling to optical fibers PMFA, PMFB because chip endfaces can—within certain limits—be cut under arbitrary angles. The angle under which the optical fibers PMFA, PMFB meet the waveguides of the Soleil-Babinet compensators SBC1, SBC4 is determined from the angle at the chip endfaces, the refractive indices, and Snells law.

The chip is operated such that Soleil-Babinet compensators SBC1, SBC4 operate as quarterwave plates with linear eigenmodes which extend parallel and perpendicular, respectively, to the chip surface. SBC2, SBC3 are operated together as an SBC with a retardation that can be varied between 0 and at least $\pi$. Segmentation into SBC2, SBC3 with retardations $\psi2=0 \ldots$ at least $\pi/2$, $\psi=0 \ldots$ at least $\pi/2$ offers due to the likewise present individual variability of eigenmodes a better possibility of compensation of unavoidable inaccuracies than an unsegmented SBC, but it can also be done without segmentation in favor of a reduced number of driving voltages. However, more segments can also be provided, possibly with larger totally achievable retardations. Depending on whether the PMFA, PMFB are mounted with azimuth angles that are either shifted by 90° with respect to each other or are equal when considering the same principal state-of-polarization at the chip endfaces either an addition or a subtraction of the differential group delays is obtained for a retardation of 0. If one quarterwave plate SBC1, SBC4 is, due to possibly differing lengths and/or angles WI, alternatively to the afore-mentioned case constructed as a three-quarter waveplate the function changes just in so far as mentioned addition and subtraction are exchanged.

Figure 11:
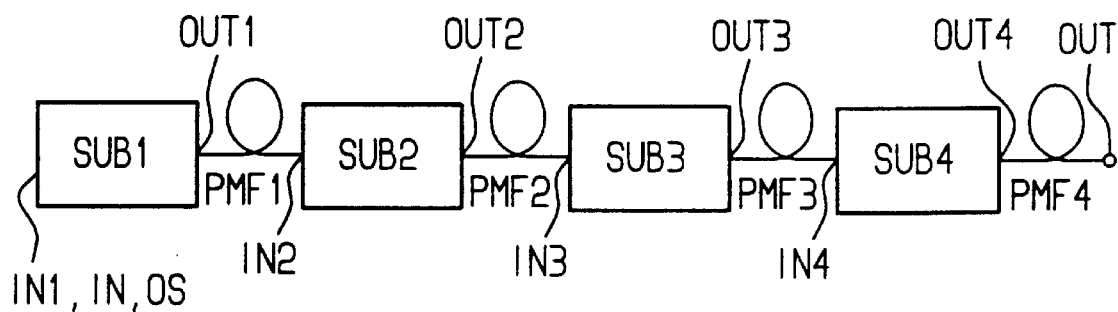
FIG. 11 is a block schematic of a polarization mode dispersion compensator with several polarization transformers.

In FIG. 11 a PMD compensator is shown with several polarization transformers SUB1 . . . SUB4 constructed in this manner and polarization-maintaining optical fibers PMF1 . . . PMF4 connecting or following these, with differential group delays and linear principal states-of-polarization exhibiting ±45° with respect to the chip surfaces. Compared to the state-of-the-art a sensibly reduced component length of the polarization transformers, a simplified driving and, most importantly and according to the principles of the invention, a better suppressability of DC drift is thereby achieved. The chip inputs are IN1 . . . IN4, the chip outputs are OUT1 . . . OUT4, chip input IN1 is at the same time input IN of the PMD compensator, the output OUT of optical fiber PMF4 is the output of the PMD compensator. A certain, e.g, the slower principal state-of-polarization of optical fibers PMF1 . . . PMF4 is adjusted at chip outputs OUT1, OUT2, OUT3 under 45°, at chip inputs IN2, IN3, IN4 under −45° with respect to the y axis. Under the condition of SBC1 and SBC4 in polarization transformers SUB1 . . . SUB4 actually operating as quarterwave plates with equal eigenmodes—here SBC1 in SUB1 forms an exception because no polarization-maintaining optical fiber is connected there—, SBC1 and SBC4 therefore each transform circular principal states-of-polarization at the input of SBC4 of each of the chips SUB1 . . . SUB 3 into the same circular principal states-of-polarization at the output of SBC1 of each of the chips SUB2 . . . SUB4. This means that the differential group delays of polarization-maintaining optical fibers PMF1 . . . PMF4 add for retardations $\psi2=0$ and $\psi3=0$ in each of the chips SUB2 . . . SUB4.

SBC2 and SBC3 on each of the substrates SUB1 . . . SUB4 each form together a mode converter Pi (i=1 . . . m, where m=4 in FIG. 11) with circular states-of-polarization as convertible and at the same time principal states-of-polarization of the waveguide in the absence of mode conversion and at the same time principal states-of-polarization of the total waveguide connecting adjacent mode converters Pi and P(i+1).

Figure 12:
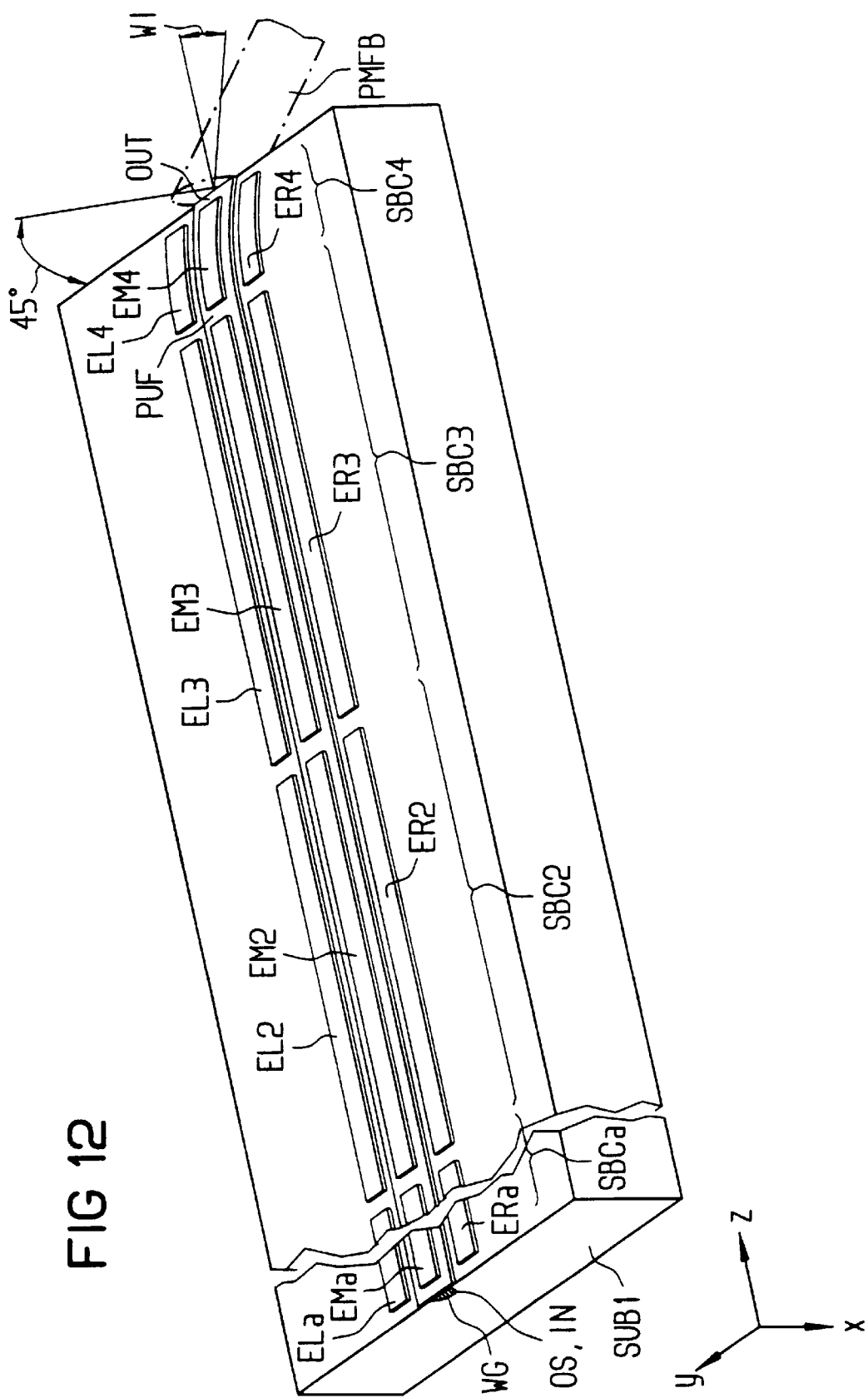
FIG. 12 is a perspective view of an architecture principle of another polarization transformer embodying the principles of the invention.

In FIG. 12 the construction of substrate SUB1 is seen. Soleil-Babinet compensators SBC2, SBC3 there form a mode converter of circular states-of-polarization, and due to Soleil-Babinet compensator SBC4 circular principal-states-of-polarization of the following polarization-maintaining optical fiber PMF1 result at the output of SBC3.

A component SBC1 operating as a quarterwave plate and a waveguide bend in front of SBC2 is not useful or not needed or provided, respectively, on substrate SUB1. Instead a Soleil-Babinet compensator SBCa is provided. It operates with full mode conversion as a rotating waveplate with retardation $\psi a=\pi$. For this purpose it is mandatory that $V1a=Vxa*\cos(\gamma a-\phi(t)/2)$ and $V2a=Vya*\cos(\gamma a-\alpha a-\phi(t)/2)$ where $(UPa-UPa0)=V1a$, $Vxa=\pi/aa$, $(UCa-UCa0)=V2a$, $Vya=\pi/bb$. One chooses, e.g., $\phi(t)=Q*t$ where $\Omega$ is again a low angular velocity. Equal breakdown voltages of the electrodes assumed, the length of Soleil-Babinet compensator SBCa should equal the sum of lengths of SBC2, SBC3.

Mode converters SBC2, SBC3 on substrates SUBj (j=1 . . . 4) can, in principle, be connected together. In this case they have to be driven by voltages $(UPj-UPj0)=V1j$, $(UCj-UCj0)=V2j$ where according to the principles of the invention $V1j=Vxj*\cos(\gamma j-\phi(t))$ and $V2j=Vyj*\cos(\gamma j-\alpha j-\phi(t))$ (j=1 . . . 4) holds, respectively. Larger variability with respect to nonideal implementation of these SBC2, SBC3 and other components is achieved, however, if additional variations, which have to be chosen such that the desired polarization transformation or PMD compensation is achieved at all times, are allowed for with respect to these voltages.

For exact adjustment of electrodes EMj (j=1 . . . 4, a) over waveguides WG $UCj0=0$ holds. In addition, there are no buffer layers below electrodes ELj, ERj which means that even in the case UPj0 unequal 0 no DC drift can occur. The only places where DC normally would occur would be the electrodes EMj. Since these receive zero-average voltages DC drift is avoided also in this embodiment according to the principles of the invention.

Rather than using mode converter SBCa a circular retarder such as a Faraday rotator or a turn of substrate SUB1 could likewise be used, the retardation $\phi(t)$ of which between these eigenmodes (and principal states-of-polarization of subsequent optical fiber pieces at the same time) fulfills just as in earlier embodiments the conditions that the averages of functions $\cos(\phi(t))$ and $\sin(\phi(t))$ vanish.

Figure 13:
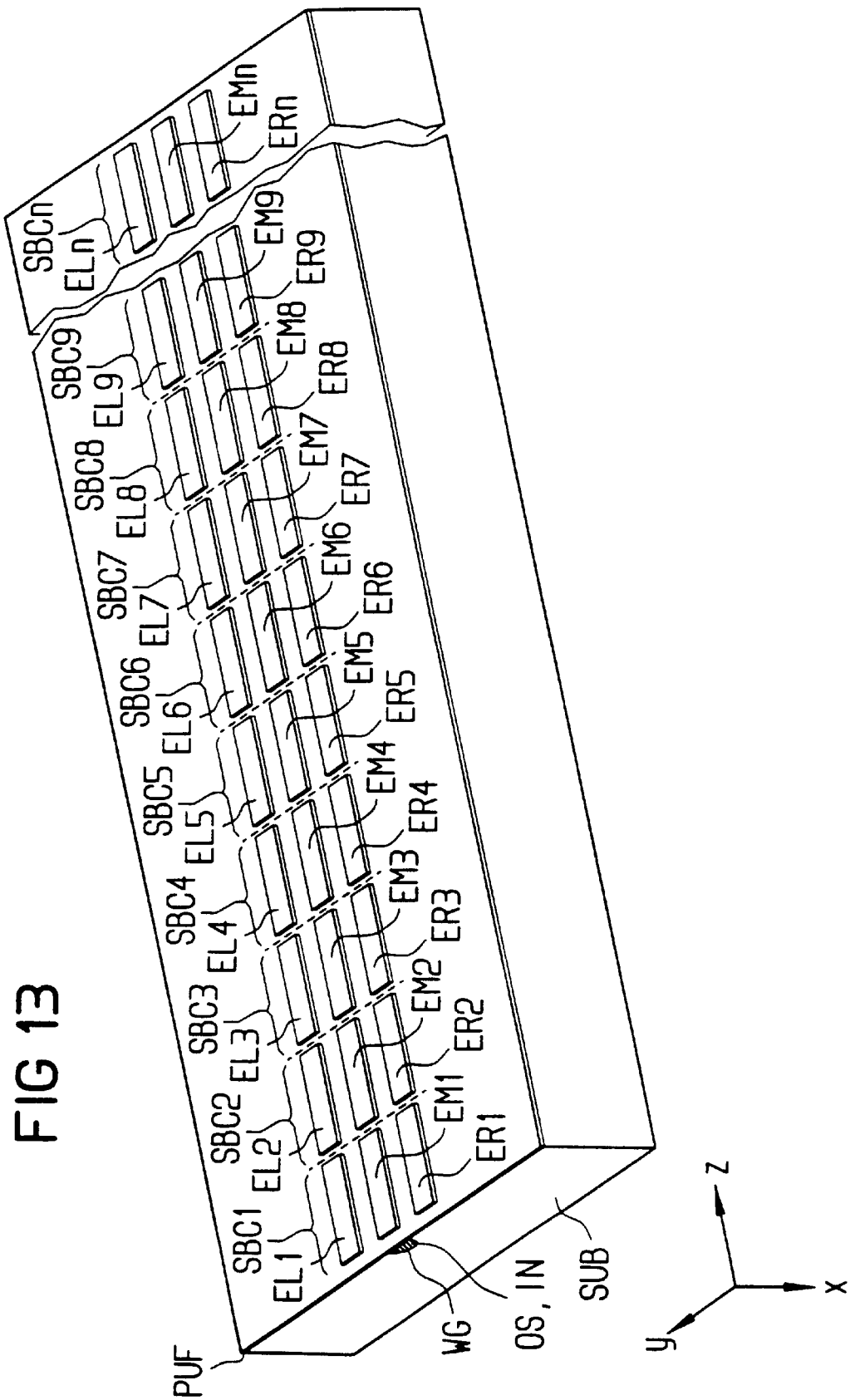
FIG. 13 is a perspective view of an architecture principle of yet another polarization transformer embodying the principles of the invention.

Using FIG. 13 another class of embodiments of the invention is now discussed which, however, continue to be based on the same principle of the invention.

Similarly to FIGS. 10 and 12 a lithium niobate substrate SUB with X cut and Z propagation is provided. Buffer layer PUF extends over the whole surface but could also be shaped like in FIG. 10, or could be omitted altogether for transparent electrodes. A waveguide WG is covered or laterally accompanied, respectively, by three longitudinally segmented electrodes. Electrodes ELi, EMi, ERi are segmented such that n=8 polarization control elements SBCi (i=1 ... n) result. The voltages applied to these electrodes are UPi and UCi according to FIG. 10. Other numbers n are likewise possible.

As has been mentioned before, for polarization transformation of a circular into any state-of-polarization or vice versa an SBCi may exhibit a retardation $\psi i=0 \ldots \pi$, see Noé, R., Heidrich, H., Hoffmann, D., Endless polarization control systems for coherent optics, IEEE J. Lightwave Techn. 6(1988)7, pp. 1199–1207. It can, as is explained there, be supplemented by another. For polarization transformation of a linear into any state-of-polarization or vice versa two SBCs with retardations $\pi/2, \pi$, i.e., electro-optically turnable quarterwave and halfwave plates, can be used in any order.

For transformation of any arbitrary into any other arbitrary state of polarization two SBCi with retardations $\psi i=0 \ldots 2\pi$ have been used, see N. G. Walker, G. R. Walker, 'Polarization control for coherent communications', IEEE J. Lightwave Techn. 8(1990), pp. 438–458. For this purpose three SBCs with retardations $\pi/2, \pi, \pi/2$, i.e, electro-optically turnable quarter-, half- and again quarterwave plate, can also be used, see F. Heismann, M. S. Whalen, 'Fast automatic polarization control system', IEEE Photon. Techn. Lett. 4(1992), pp. 503–505. In addition an SBC with retardation $0 \ldots \pi$ and another SBC with retardation $\pi$ is sufficient for this purpose.

In addition each applicable configuration with values $\psi i$max of retardations $\psi i$ can always be replaced by configurations in which one or several retardations can be chosen freely between smaller values or 0 and this value $\psi i$max as a maximum. This means that for transformation of any into any other state-of-polarization three SBCs with retardations $\psi 1=0 \ldots \pi/2, \psi 2=0 \ldots \pi, \psi 3=0 \ldots \pi 2$ or two SBCs with retardations $\psi 1=0 \ldots \pi, \psi 2=0 \ldots \pi$ can be used for example. Likewise, for transformation of a linear into any other state-of-polarization or vice versa two SBCs with retardations $\psi 1=0 \ldots \pi/2, \psi 2=0 \ldots \pi$ can be used in any order.

Finally, segmenting an SBC into several, where the adjustability of the sum of retardations be the same as the adjustability of the retardation of the SBC that has been segmented, also allows the desired polarization transformations in all such cases. For example, in this way transformations of a circular into any desired state-of-polarization or vice versa can also be performed by two, and transformations of a linear into any desired state-of-polarization or vice versa can be performed by three, and transformation of any into any other desired state-of-polarization can be performed by four SBCs with retardations of $0 \ldots \pi/2$ each. In each case additional SBCs can also be added.

Regarding functionality of polarization transformers it has been reported in Proc. 3 of the European Conference on Optical Communication, Sep. 20–24, 1998, Madrid, Spain, pp. 55, 57, that a polarization transformer inside a PMD compensator should be capable of transforming a principal state-of-polarization of a differential group delay section endlessly into any state-of-polarization. According to what has been said above one SBC with retardation $0 \ldots \pi$ is sufficient for this purpose in the case of circular principal states-of-polarization. In the case of linear principal states-of-polarization for example 2 SBCs with retardations $\pi, \pi/2$ or $0 \ldots \pi, 0 \ldots \pi/2$ in any order are needed for this purpose. In each such case a segmentation into more SBCs or SBCs with larger individual or total maximum retardations is also possible—as has been discussed above. In the publication mentioned above segmenting of the necessary polarization transformation into more mode converters with incomplete mode conversion, separated by differential group delay sections is also demonstrated. From what has been said it follows that at least one mode converter such as an SBC can be used as a polarization transformer. And the more mode converters or SBCs there are and the larger the retardation of these are, the more functionally useful becomes the polarization transformer that is part of the PMD compensator. In the embodiment of FIG. 13 the case of a general number n is depicted but all afore-mentioned cases can be realized by ommitting individual or connecting adjacent Soleil-Babinet compensators (SBCs). With respect to the afore-mentioned case four such adjacent SBCs are used here for normal polarization transformation. Another embodiment for the case of linear principal states-of-polarization incorporates 2 SBCs with retardations $\pi, \pi/2$ or $0 \ldots \pi, 0 \ldots \pi/2$ in any order.

As alternative embodiments with, however, reduced functionality it should be mentioned that either the phase shifting voltage UPi can be chosen constant, e.g, equal UPi0 or zero, or the mode conversion voltage UCi can be chosen constant or equal to zero. In the latter case electrode EMi can be omitted. For simplicity we always discuss SBCs in the following, although those simplified polarization control elements could also be used.

As further embodiments all mode converters that allow for mode conversion in phase and in quadrature can be used. In particular these are all mode converters (converter cells), possibly cascaded, so that comb electrode allowing for mode conversion in phase, and comb electrodes allowing for mode conversion in quadrature alternate, which have been introduced above with denominations P1, Pj, Pn, PV1, PVj, PVn, PMCj, PMj. This follows from the fact that Soleil-Babinet compensators are mode converters of circular states-of-polarization while the afore-mentioned polarization control elements are mode converters of TE and TM states-of-polarization, however, in each case freely selectable in phase and in quadrature. Voltages UPj (j be an index just as i) must in those cases be replaced by voltages V1j, and voltages UCj must in those cases be replaced by voltages. A Soleil-Babinet compensator SBCj can be replaced by a mode converter PVj or by several cascaded mode converter cells Pj or PMj.

Normally the SBCs are not operated with constant voltages because the purpose of the polarization transformer is in general to transform a variable state-of-polarization at the output of a lightwave transmission fiber in a polarization mode dispersion compensator and in similar applications into other desired states-of-polarization where these states-of-polarization are variable in general. The polarization transformer is therefore normally driven by variable voltage sources which receive information from a controller. The controller is just as the polarization transformer a part of a polarization control system.

Figure 14:
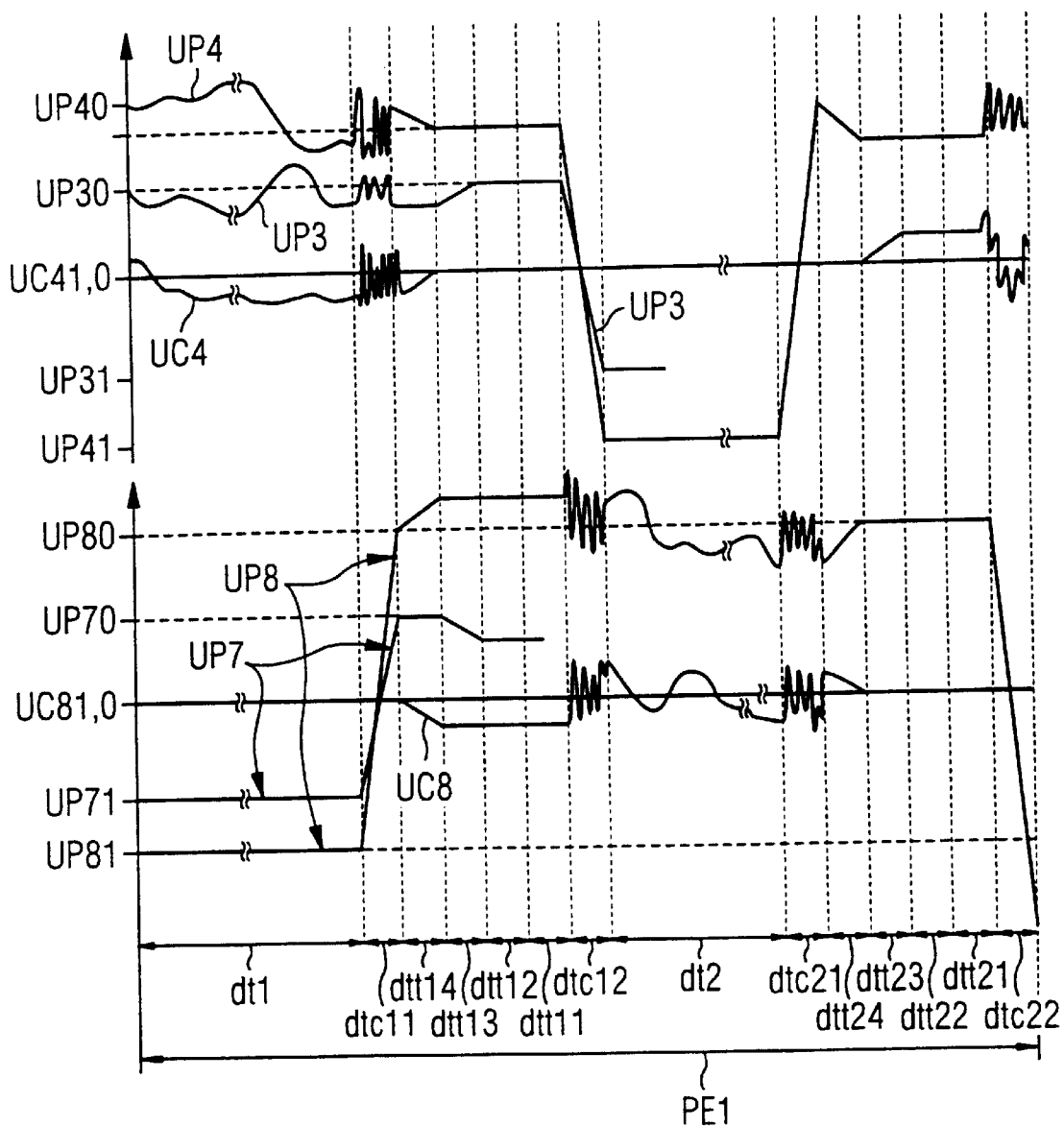
FIG. 14 is a time diagram of driving voltages.
Figure 15:
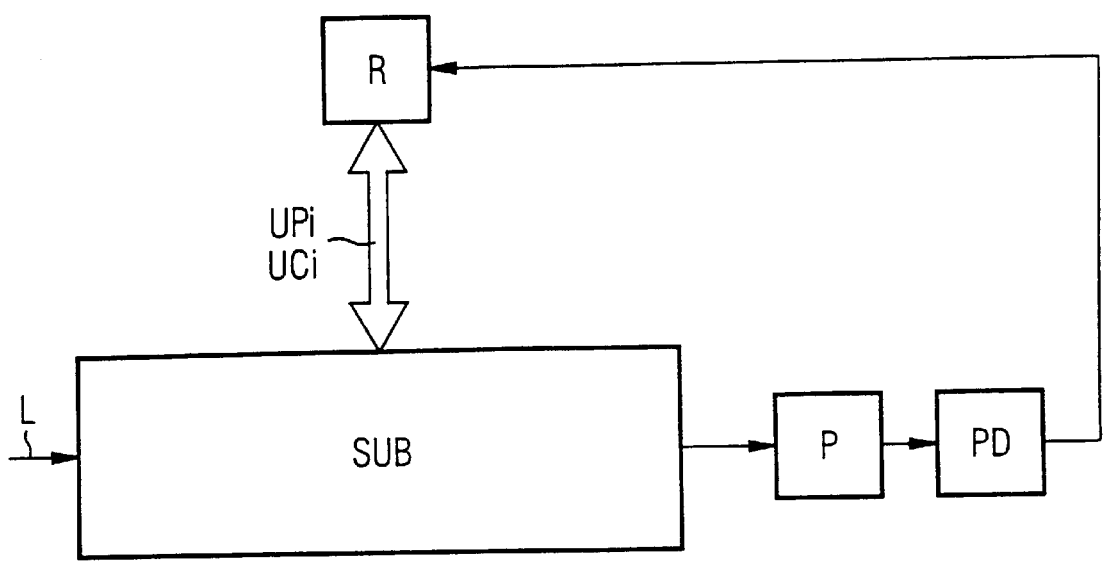
FIG. 15 is a block diagram of a control unit with polarization transformer.

According to the principles of the invention more Soleil-Babinet compensators SBCi (i=5 ... 8) are provided along the waveguides subsequent to the former four (i=1 ... 4). Analogous statements are true for polarization transformers consisting of another original number of mode converters or SBCs, which also may have different lengths, corresponding to different maximum retardations. At the beginning, during time duration dt1 of FIG. 14, the Soleil-Babinet compensators SBC1 . . . SBC4 perform normal polarization control, called normal operation in the following. For this purpose there is provided, just as in the state-of-the-art, a controller R which generates electrode voltages or parts thereof UPi, UCi and which receives information about the reached degree of polarization matching from an external detection element, e.g., a photo-detector PD placed behind a polarizer P. This is depicted in FIG. 15. As a controller R a microprocessor is particularly suited.

During time durations dt1 the electrode voltages of the additional four SBC5 . . . SBC8 are chosen by means of voltage values UPi1, UCi1 (i=5 . . . 8) such that they are opposed to the voltages necessary for normal operation. The latter state is called reverse operation in the following. For this purpose it may, e.g., be chosen UPi1=k*UPi0, UCi1= k*UCi0 (i=5 . . . 8) with a constant k=−1. As has been mentioned before UCi0 equals zero, ideally. In the following time duration dtc11 the opposed electrode voltages are slowly shifted such as to achieve phase matching in SBC5 . . . SBC8 with ψi=0 (i=5 . . . 8), i.e. UPi=UPi0, UCi=UCi0 (i=5 . . . 8) in this case. The disturbances of the required polarization transformations that are caused thereby are compensated for by readjusting the electrode voltages of SBC1 . . . SBC4. During time duration dtc11 phase matching in SBC5 . . . SBC8 can either be adjusted simultaneously, or in several of SBC5 . . . SBC8 one by one. Once phase matching in SBC5 . . . SBC8 has been achieved, the retardation of SBC4 is slowly reduced from its present operating point ψ4=ψ40 until 4=0 verkleinert, and at the same time that of SBC8 is increased by the same amount from ψ8=0 to ψ8=ψ40. This happens during time duration dtt14. During this operation equal ratios of TE-TM phase shifting to TE-TM mode conversion are chosen in both SBCs, resulting in equal azimuth angles of the eigenmodes and in SBC8 taking over the function of SBC4. Subsequently SBC takes over in an analogous process the function of SBC3 during time duration dtt13, SBC6 the function of SBC2 during time duration dtt12, and SBC5 the function of SBC1 during time duration dtt11. When this has been completed just those voltages UPi=UPi0, UCi=UCi0 (i=1 . . . 4) are present at SBC1 . . . SBC4 which are needed for phase matching. Now, during time duration dtc12, the voltages at SBC1 . . . SBC4 are slowly changes such that they become opposed to the voltages required for normal polarization control and assume values UPi1, UCi1 (i=1 . . . 4), in the simplest case UPi1=k*UPi0, UCi1=k*UCi0 (i=1 . . . 4) with k=−1. The disturbances of the required polarization transformations generated thereby are compensated for by readjusting the electrode voltages of SBC5 . . . SBC8. After completing this SBC1 . . . SBC4 operate in reverse operation. Time durations dt1 until dtc12 are the first half of a period PE1. In the second half of a period with time durations dt2, dtc21, dtt24, dtt23, dtt22, dtt21, dtc22 the procedure is executed in reversed direction and order, whereby the polarization control function is transferred back from SBC5 . . . SBC8 to SBC1 . . . SBC4. These periods PE1, PE2, i.e, this transferring forth and back of electrode voltage parts, are repeated cyclically. The behavior of electrode voltage parts UPi, UCi is depicted in FIG. 14 as a function of time t.

The simplest method is to apply during reverse operation just those voltages UPi=−UPi0, UCi=−UCi0 to the electrodes of SBCi which are the negatives of the voltages needed for phase matching. From FIG. 14 it can be seen that, e.g., UP4 assumes value UP40 approximately during time durations dt1, dtc11, dtt14, dtt13, dtt12, dtt11, while it assumes value UP41 only during time duration dt2. In order to make the temporal averages of the voltages disappear according to the principles of the invention as far as possible, UPi1 are chosen in a preferred embodiment equal to UPi1=k*UPi0 (i=1 . . . 8) where k is a constant that is more negative than −1 and assures equal areas of UPi above and below the line indicating zero voltage. Analogous statements hold for UCi1=k*UCi0. In this case all electrodes carry, in temporal average, the voltage 0, for which reason no DC drift can occur. As long as dtc11, dtt14, dtt13, dtt12, dtt11, dtc12, dtc21, dtt24, dtt23, dtt22, dtt21, dtc22 are chosen small compared to dt1, dt2 constant k approaches the value −1. This is advantageous because in this case the required electrode breakdown voltage is lower.

The time durations of the actual periods are chosen so that they are of similar or—and this is even more advantageous—of smaller or much smaller order than the time constants of DC drift.

The actions during time durations dtt14, dtt13, dtt12, dtt11 can, in alternative embodiments, be conducted during the same time which may reduce the total time required for this. The same is true for the actions during time durations dtt24, dtt23, dtt22, dtt21. Both is sketched in FIG. 16. In further embodiments the actions of time durations dtc11, dtc12, dtc21, dtc22 can be pulled into neighboring time durations, again with the purpose of a reduced execution time.

For many applications the just-described drift reduction will be sufficient and may be considered to be quasi equal to a drift compensation. However, for deviations of electrode voltages UPi, UCi from their values UPi0, UCi0 for phase matching in the case of ψi being different from zero during normal operation a reverse operation as just described will provide no compensation. If these deviations do not average out over extended periods of time a certain DC drift will remain.

In another embodiment of the invention the controller R therefore determines the temporal integrals of the electrode voltages. Instead of integrators lowpass filters with very large time constants, preferably much larger than the duration of periods PE1, PE2 can also be employed. This will no longer be mentioned expressively in the following. Controller R chooses voltage values UPi1, UCi1 which are being approached and then applied during reverse operation in such a way that the magnitudes of the integrals of electrode voltages UPi, UCi are being reduced. This is sketched in FIG. 16 by the example of the temporal behavior of a voltage UPi1 over two periods PE1, PE2. A first voltage UPi11 is chosen so as to make the integral F21 (area with positive or negative sign) equal to the negative of integral F11. A second voltage UPi12 is chosen so as to make integral F22 equal to the negative of integral F12. Incomplete compensation of the integral of an electrode voltage or an overcompensation in the other direction can be tolerated if the time durations of the periods are small compared to the time constants of DC drift. It just has to be made sure that the compensation in the following period is performed not in a worse or preferably in a better manner.

Controller R is preferably of digital nature so that the integrals of the electrode voltages (or the lowpass-filtered values of these) can easily be calculated or determined over long times with a high accuracy. In this way drift is completely compensated for.

In the embodiments of the invention described by FIGS. 13 to 16 the required effort for polarization control is quasi duplicated for the purpose of DC drift compensation. Duplication of the number of mode converters or SBCs by those added according to the principles of the invention is particularly advantageous. It is also possible to add an even larger number of mode converters or SBCs or other polarization transformers.

In other cases, if the electrodes exhibit breakdown voltages which are substantially higher than the voltages necessary during normal operation, a reduction of the effort is possible. Less new SBCs (SBC5 . . . SBCn) with 4<n<8 are added to the original ones (SBC1 . . . SBC4). This means that for each SBC there is less time available in reverse operation. Therefore constants k must be made more negative.

While the mentioned embodiments referred to polarization transformers in lithium niobate the invention is also useful for polarization transformers in other crystals, e.g., lithium tantalate or semiconductors, and in general for all polarization transformers described by the same mathematical formalism. Therefore in the claims some of the aforementioned terms can be replaced by others, e.g., SBC by polarization control element, electrodes by driving terminals, phase shifting voltage and mode conversion voltage by signal parts.

E.g., SBCs can be replaced by other mode converters, in particular TE-TM mode converters in a lithium niobate crystal with X cut an Y propagation as described in IEEE Journal of Quantum Electronics, Vol. QE-18, Nr. 4, April 1982, pp. 767–771.

The mentioned polarization transformer or several of these polarization transformers can also be part(s) of an optical polarization mode dispersion compensator, preferably in combination with components for generation or compensation of a differential group delay between two orthogonal principal states-of-polarization.

In the case of four original SBCs (SBC1 . . . SBC4) with retardations that can reach values of at least $\pi/2$ alternating reverse operation by four added SBCs (SBC5 . . . SBC8) is possible in all cases, also for the mentioned other combinations for endless transformation of any into any other desired state of polarization. But also in cases with reduced number of SBCs or mode converters and/or reduced achievable retardation values reverse operation is possible. This can be deduced, e.g., from equations (7) to (11) in IEEE J. Lightwave Technology, Band 17, No. 9, 1999, pp. 1602–1616. In these cases the function of an SBC or mode converter that has to be put into reverse operation is at least partly taken over by one or several SBCs or mode converters which are not directly adjacent to it but are, e.g., separated from it by one or more differential delay sections. For example, a polarization transformer SUB1 of FIG. 11, now—in contrast to what has been explained until now for FIG. 11—composed of 2 SBCs with maximum retardations of $\pi$ and $\pi/2$ (or 3 SBCs with maximum retardations $\pi/2$) can guarantee alternating reverse operation by cascading it with 2 more SBCs with maximum retardations $\pi$ and $\pi/2$ (or 3 SBCs with maximum retardations $\pi/2$). If it is used not only for transformation of horizontal or vertical polarization into any desired state-of-polarization or vice versa but is, as shown in FIG. 11, part of a PMD compensator then other polarization transformers SUB2, SUB3, SUB4, preferably situated further down the line in direction of light propagation and preferably constructed like SUB1 have to adjust their voltages UPi', UCi', UPi'', UCi'', UPi''', UCi''' during phases dtc11, dtc12, dtc21, dtc22 for the purpose of retaining the overall function of the optical PMD compensator. Therefore the behavior of voltages UP8, UC8 sketched in FIG. 14 could also be the behavior of one of the voltages UPi', UCi', UCi'', UPi''', UCi''' of one of the polarization transformers SUB2, SUB3, SUB4.

Figure 16:
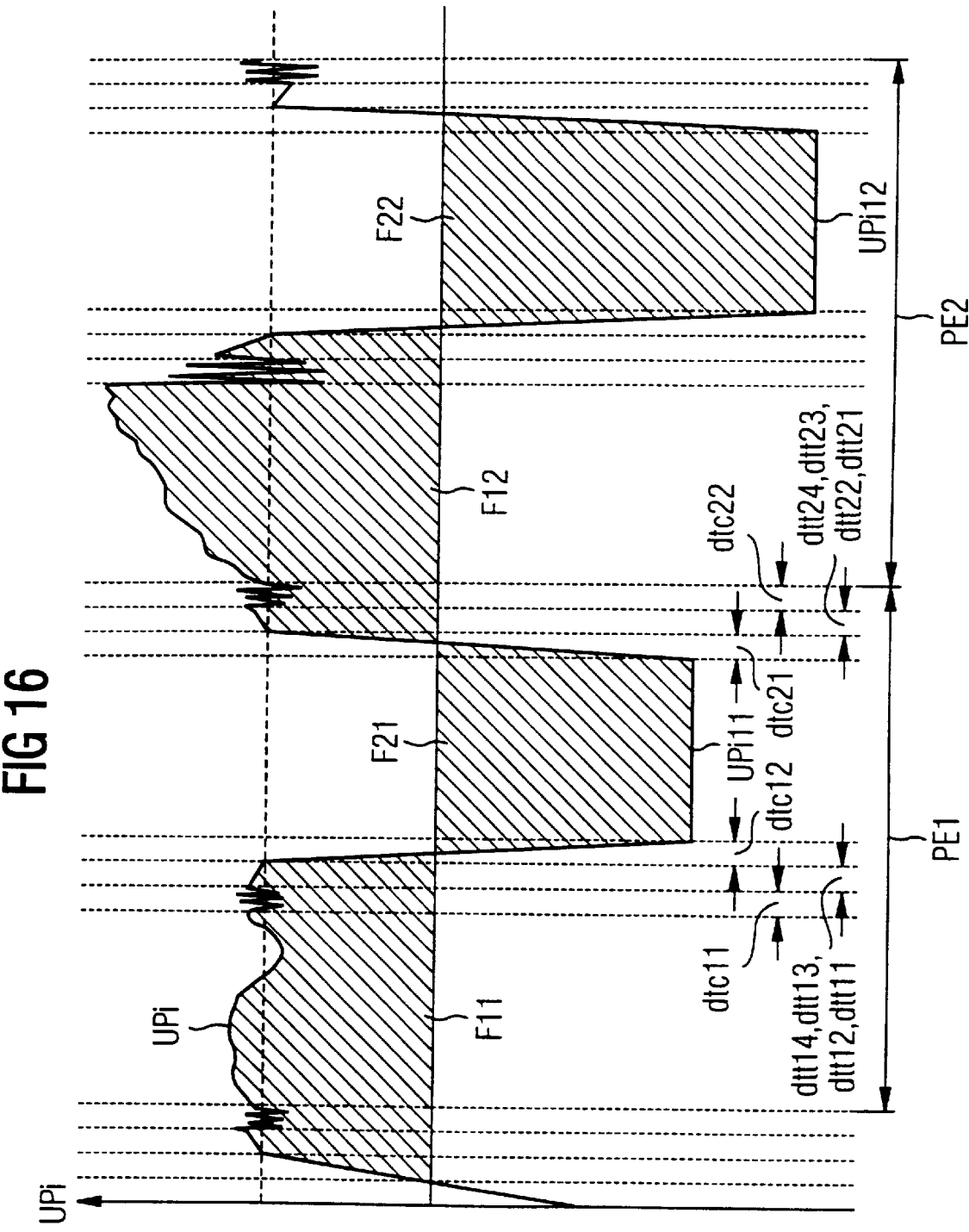
FIG. 16 is another time diagram of driving voltages.

While it has just been stated that a polarization transformer composed of 2 SBCs with maximum retardations of $\pi$ and $\pi/2$ (or 3 SBCs with maximum retardations $\pi/2$) can guarantee alternating reverse operation by cascading it with 2 more SBCs with maximum retardations $\pi$ and $\pi/2$ (or 3 SBCs with maximum retardations $\pi/2$) it should be noted that this is easily possible only in cases in which just a differential phase shift between that orthogonal pair of polarizations which are principal states-of-polarization of the subsequent differential group delay section of a PMD compensator, or of which one is the input or output state-of-polarization of the whole polarization transformer chip, and in which individual zeroing of voltage integrals explained in context with FIG. 16 extends only to voltages UPi0, UCi0 with a given ratio UPi0/UCi0 suitable for generation or cancellation of this differential phase shift. Assuming horizontal/vertical orientation of the subsequent differential group delay section only DC drift of UPi could be canceled easily. In other cases, where drifts of UPi and UCi are to be canceled individually it is preferable if the added SBCs are capable of transforming any given into any other given state-of-polarization. As an example, consider a polarization transformer as part of a PMD compensator, originally consisting of 3 SBCs with retardations 0 . . . $\pi/2$ each. The added polarization transformer may consist of 4 SBCs with retardations 0 . . . $\pi/2$ each. The added SBCs may be at the input side of this chip, i.e. SBC1 . . . SBC4 of FIG. 13 while the original SBCs are SBC5 . . . SBC7. Of course it is helpful to provide larger retardation ranges and/or more SBC sections in order to take nonideal device behavior etc. into account, for example to provide also SBC8 of FIG. 13 as a part of the original polarization transformer. Indeed, the easiest-to-use embodiment is obtained if both original and added polarization transformer are capable of transforming any incident into any desired state-of-polarization, for example consisting of SBC5 . . . SBC8 and SBC1 . . . SBC4, respectively, with retardations of at least 0 . . . $\pi/2$ each. This capability assures that the additional degrees of freedom in polarization control which are necessary to reverse-bias not only UPi but also UCi are always available in the normally biased polarization transformer on the same chip.

As can be seen from FIG. 14 swapping individual SBCs between normal and reverse operation in periods dtc11, dtc12, dtc21, dtc22 requires relatively fast voltage variations at other SBCs which during these periods are responsible for normal polarization control near their operation points UP40, UP30, UC40=0, UP80, UP70, UC80=0.

Figure 20:
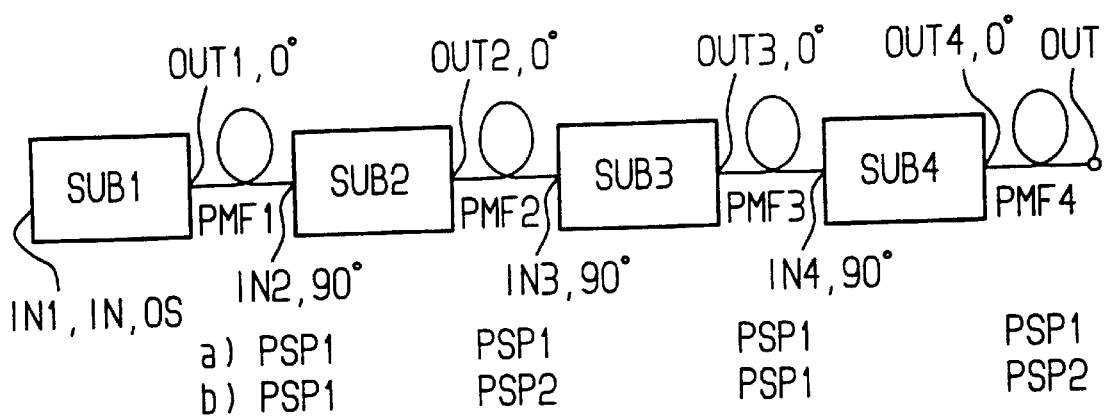
FIG. 20 is a schematic block view of another polarization mode dispersion compensator with several polarization transformers.

However, a sensible reduction of frequency and changing speed of these variations is possible if one makes sure that transition of one SBC from normal into reverse operation or vice versa is at least partly compensated for by the transition of an SBC on another crystal substrate from normal to reverse operation or vice versa. This is depicted in FIG. 20. The arrangement is similar to FIG. 11. The PMD compensator is passed from input IN to output OUT by an optical signal OS.

In each case one specific principal state-of-polarization PSP1, e.g., the slower one, of optical fibers PMF1, PMF2, PMF3 is adjusted to be parallel to the chip surface at the chip outputs OUT1, OUT2, OUT3. At the subsequent chip inputs IN2, IN3, IN4 this PSP1 is in each case adjusted perpendicular to the chip surface. According to FIG. 13 this is the Y axis of a LiNbO3 crystal. In FIG. 20 this is clarified by symbols 0° (for parallel) and 90° (for perpendicular) at OUT1, OUT2, OUT3 and IN2, IN3, IN4, respectively. Facultatively one can instead adjust PMF4 at OUT4 under 0° (parallel) for PSP1. If the principal states-of-polarization adjusted according to the angles of FIG. 20 are PSP1 in all cases—which is symbolized there in line a)—the differential group delays of delay sections PMF1, PMF2, PMF3, PMF4 add in the zero-positions of the polarization transformers SUB2, SUB3, SUB4. If the principal states-of-polarization adjusted according to the angles of FIG. 20 are alternatively PSP1 and PSP2—which is symbolized there in line b)—the differential group delays of neighboring delay sections PMF1, PMF2, PMF3, PMF4 subtract in the zero-position of polarization transformers SUB2, SUB3, SUB4. Depending on the application the first or second possibility can be advantageous. Other embodiments, e.g., PSP2, PSP2, PSP1, PSP1 for angle adjustments of PMF1, PMF2, PMF3, PMF4, are possible. Further variations are possible using polarization transformers with different crystal cuts.

Figure 21:
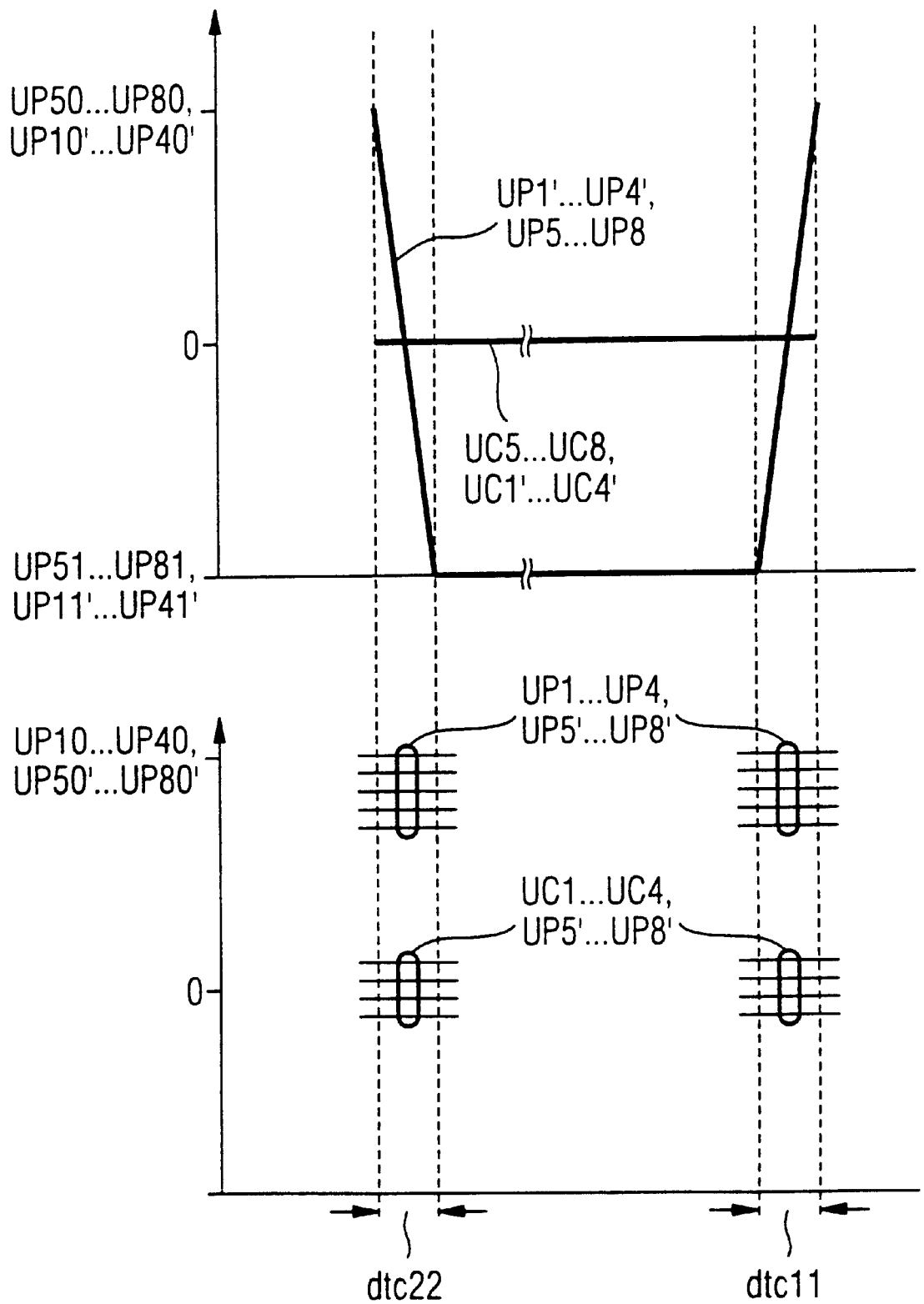
FIG. 21 is yet another time diagram of driving voltages.

The particular advantage of this arrangement can be seen from FIG. 21. The SBCs on polarization transformers SUB1 . . . SUB4—each constructed according to FIG. 13—possess under equal fabrication conditions at least similar intrinsic birefringences. Let SBCs in and voltages at SUB1 be SBCi, UPi, UCi, let SBCs in and voltages at SUB2 be SBCi', UPi', UCi', let SBCs in and voltages at SUB3 be SBCi", UPi", UCi", and let SBCs in and voltages at SUB4 be SBCi''', UPi''', UCi''', respectively. Let i=1 . . . n. Let SBC1, SBC', SBC1", SBC1''' be near the respective input IN1, IN2, IN3, IN4, while SBCn, SBCn', SBCn", SBCn''' are near the respective output OUT1, OUT2, OUT3, OUT4. Number n can, e.g., be equal to 8, but, as has been mentioned before, all other numbers larger than 1 are possible. Case n=2u refers to the enhancement of a polarization transformer with u SBCs by another, constructed in the same manner, equally with u SBCs. However, unequal n larger than 1 are likewise possible. Likewise, unequal lengths of SBCs are likewise possible.

Voltages UPi0, UPi0', UPi0", UPi0''' are approximately identical for equal fabrication conditions of SUB1 . . . SUB4. In this case voltages UCi0, UPi0', UPi0", UPi0''' are also approximately identical, i.e. approximately identical to zero. Due to the fact that PMF1 . . . PMF3 are each twisted by 90° changes of UPS . . . UP8 cancel the effects of changes of UP1' . . . UP4' having equal change direction, assuming no mode conversion takes place in these SBC5 . . . SBC8 and SBC1' . . . SBC4'. UC5 . . . UC8 and UC1' . . . UC' must be at least approximately equal to zero for this purpose. Analogous statements and situations apply for the SBCs before and behind PMF2, and for the SBCs before and behind PMF3. The transitions between normal and reverse operation should therefore in the SBCs before and behind a differential delay section PMF1 . . . PMF3 occur during the same time. So, if SBC1 . . . SBC4 are in normal operation this is also true for SBC5' . . . SBC8', SBC1" . . . SBC4" and SBC5''' . . . SBC8'''. This statement is also true for reverse operation. And, if SBC5 . . . SBC8 are in normal operation this is also true for SBC1' . . . SBC4', SBC5" . . . SBC8" and SBC1''' . . . SBC4'''. This statement is also true for reverse operation. Transition between normal and reverse operation of SBC5''' . . . SBC8''' is due to the 0° adjustment of PMF4 not of importance for PMD compensation anyway under normal circumstances. This means that ideally only transitions between normal and reverse operations of SBC1 . . . SBC4 have to be compensated for by SBC5 . . . SBC8. Transitions at SBC5 . . . SBC8 and SBCi', SBCi", SBCi''' are harmless in contrast. Due to this fact these transitions can be carried out much faster or else one can defend much better against nonideal behavior of SUB1 . . . SUB4.

FIG. 21 shows in an example the transition from normal to reverse operation and back of SBC5 . . . SBC8 and SBC1' . . . SBC4'. Equally constructed components SUB1, SUB2 assumed the trajectories of UP5 . . . UP8, UP1' . . . UP' during transition dtc22 can be chosen identical, and voltages UC5 . . . UC8, UC1' . . . UC' can likewise be chosen identical, i.e. identical to zero. In this ideal case no voltage change is necessary in SBC1 . . . SBC4, SBC5' . . . SBC8' during dtc22 which allows for constant voltages UP1 . . . UP4, UP5' . . . UP8', UC1 . . . UC4, UC5' . . . UC8'.

Transition from reverse to normal operation of SBC5 . . . SBC8 and SBC1' . . . SBC' takes place in an analogous manner in period dtc11. The only difference is that due to normal operation of SBC1 . . . SBC4, SBC5' . . . SBC8' the voltages UP1 . . . UP4, UP5' . . . UP8', UC1 . . . UC4, UC5' . . . UC8' will this time assume other—generally constant—values.

Should needed voltages and component birefringences not be identical then at least part of otherwise needed changes of voltages UP1 . . . UP4, UP5' . . . UP8', UC1 . . . UC4, UC5' . . . UC8' during dtc22, dtc11 can be made unnecessary. In total this still results in a substantial simplification of control actions.

Another advantage of coupling PMF1 . . . PMF4 at one end under 0° and at the other end under 90° is the compensation of the polarization dependence of the coupling losses at these two places. There is also the possibility of coupling PMF1 . . . PMF4 not always under 0° and 90° to SUB1 . . . SUB4 but instead with pairwise identical orientations, e.g., always under 0°. However, for the latter case SUB1, SUB2, SUB3, SUB4 must alternately exhibit positive and negative intrinsic (i.e., more or less to be compensated for in normal operation) birefringences.

We claim:

1. A method for polarization transformation or polarization mode dispersion compensation, configured to perform variable and static, user-specifiable polarization transformations or polarization mode dispersion compensation or classes thereof, which comprises:

feeding control voltages to control electrodes for changing a state-of-polarization or a polarization mode dispersion of an optical signal;

providing at least one extra independent control variable influencing at least one control voltage but not being necessary to achieve the user-specifiable polarization transformation or polarization mode dispersion compensation or classes thereof; and adjusting the control voltages to be substantially DC component-free.

2. The method according to claim 1, which comprises applying a differential phase modulation of two orthogonal principal states-of-polarization of the optical signal which are identical to the principal states-of-polarization of a polarization transformer at a signal input with a continuous differential phase shift chosen such that a temporal average of a cosine function thereof and a temporal average of sine function thereof vanish at least approximately.

3. The method according to claim 2, which comprises at least partly applying the differential phase shift by a first differential phase modulator of the principal states-of-polarization.

4. The method according to claim 3, which comprises driving the phase modulator with a modulator driving voltage being substantially a linear function of the differential phase shift.

5. The method according to claim 2, which comprises applying the differential phase modulation at least partly by a first mode converter of the principal states-of-polarization.

6. The method according to claim 5, which comprises performing a full mode conversion with the first mode converter.

7. The method according to claim 5, which comprises effecting with the mode conversion a differential phase shift between the principal states-of-polarization.

8. The method according to claim 5, which comprises operating a mode converter used to generate the differential phase modulation with mode converter driving voltages being at least approximately linear functions of phase-shifted cosine functions of one half of the differential phase shift.

9. The method according to claim 5, which comprises performing a differential phase shift $\phi(t)=\Omega*t$ where $\Omega$ is a low angular frequency.

10. The method according to claim 2, which comprises using converter driving voltages being at least approximately linear functions of phase-shifted cosine functions of the differential phase shift, and which further comprises changing, for a change of state-of-polarization or PMD compensation at least one of the amplitudes and the phase angles of the functions.

11. The method according to claim 2, wherein the principal states-of-polarization in the region of a mode converter are right and left circular states-of-polarization.

12. The method according to claim 2, wherein the principal states-of-polarization in the region of a mode converter are transverse electric and transverse magnetic states-of-polarization.

13. The method according to claim 1, which comprises using converter driving voltages with equal maximum amplitude for driving converter electrodes of a converter cell.

14. The method according to claim 1, which comprises canceling the differential phase modulation of the optical signal at the input by an opposite differential phase modulation at the signal output.

15. The method according to claim 1, which comprises selecting a shape of the differential phase shift from the group consisting of triangular, sinusoidal, and trapezoidal as a function of time.

16. The method according to claim 15, which comprises performing a triangular phase shift with maximum values of $n*(\pm\pi)$.

17. The method according to claim 1, which comprises using continuous DC component-free driving voltages only for driving part of phase modulators or mode converters or converter cells, and using control voltages generated by a controller as remaining driving voltages.

18. The method according to claim 1, which comprises providing at least one polarization control element to at least partly take over a polarization control function of another polarization control element, and vice versa, wherein the other polarization control element, the polarization control function of which has been taken over by the at least one polarization control element, receives driving voltages opposed to the driving voltages for polarization control function, and which comprises choosing a temporal average of at least one driving voltage at least approximately equal to zero.

19. The method according to claim 18, which comprises, after completion of a time duration, continuously transferring opposed driving voltage parts into driving voltage parts during a time duration, by continuously transferring, during subsequent time durations, a polarization control task of polarization control elements to other polarization control elements, by continuously transferring driving voltage parts into opposed driving voltage parts in a subsequent time duration, and by carrying out the polarization control task in a subsequent time duration and in a time duration following the subsequent time duration with the other polarization control elements.

20. The method according to claim 18, which comprises choosing with a controller the opposed driving voltage parts such that the temporal integrals of the driving voltages substantially vanish.

21. The method according to claim 18, wherein, if a connection is made from a first polarization control element to a further polarization control element with either equal or exchanged principal states-of-polarization, substantially compensating for changes of driving voltage parts of the first polarization control element by changing driving voltage parts of the further polarization control element, while maintaining the desired polarization transformation.

22. The method according to claim 21, wherein the compensating step causes, during the changes, driving voltage parts of polarization control elements not connected to the first polarization control element or further polarization control element, respectively, by the connection, to be subjected to reduced or vanishing changes.

23. The method according to claim 21, wherein, if a connection is made with exchanged principal states-of-polarization, changes of voltage parts of the first polarization control element and changes of voltage parts of the further polarization control element have the same polarities.

24. The method according to claim 21, wherein, if a connection is made with equal principal states-of-polarization, changes of voltage parts of the first polarization control element and changes of voltage parts of the further polarization control element have opposed polarities.

25. The method according to claim 18, which comprises providing a number of polarization control elements that can at least partly take over the polarization control function of other polarization control elements, and vice versa, equal to a number of the other polarization control elements.

26. The method according to claim 18, which comprises providing between one and six polarization control elements, which can at least partly take over the polarization control function of other polarization control elements and vice versa.

27. The method according to claim 18, which comprises providing four polarization control elements, which can at least partly take over the polarization control function of other polarization control elements and vice versa.

28. The method according to claim 1, which comprises feeding an output signal of a polarization transformer or PMD compensator to an input of at least one polarization beamsplitter and emitting, at outputs of the polarization beamsplitter, orthogonally polarized signal parts.

29. A polarization transformer for polarization transformation or polarization mode dispersion compensation, the transformer being configured to perform variable and static, user-specifiable polarization transformations or polarization mode dispersion compensation or classes thereof, comprising:

a chip having a waveguide with an input for receiving an input optical signal;

a plurality of mode converters receiving DC component-free control voltages for changing a state-of-polarization or a polarization mode dispersion of the input optical signal;

a control variable device providing at least one extra independent control variable influencing at least one control voltage but not being necessary to achieve the user-specifiable polarization transformation or polarization mode dispersion compensation or classes thereof; and a device selected from the group consisting of a differential phase modulator and a mode converter at said input.

30. The polarization transformer according to claim 29, wherein said waveguide has an output, and another device selected from the group consisting of a phase modulator and a mode converter at said output.

31. The polarization transformer according to claim 29, which comprises at least one polarization control element composes of a plurality of converter electrodes running parallel to said waveguide on said chip.

32. The polarization transformer according to claim 29, wherein said mode converter comprises a plurality of converter electrodes running parallel to said waveguide on said chip.

33. The polarization transformer according to claim 31, which comprises a further polarization control element operating substantially as a quarterwave plate, and having eigenmodes allowing for a transformation of a circular state-of-polarization into a principal state-of-polarization of a polarization-maintaining optical fiber connected thereto.

34. The polarization transformer according to claim 29, which comprises at least one polarization-maintaining optical fiber connected to said chip at a defined connection point and having principal states-of-polarization enclosing angles of ±45° with respect to a chip surface of said chip, and a polarization control element disposed at said connection point and having substantially horizontal and vertical eigenmodes.

35. The polarization transformer according to claim 29, wherein said differential phase modulator is a circular retarder.

* * * * *